(12) United States Patent
Dong

(10) Patent No.: US 12,081,902 B2
(45) Date of Patent: Sep. 3, 2024

(54) SYSTEMS AND METHODS FOR SIGNAL TRANSMISSION

(71) Applicant: ZHEJIANG DAHUA TECHNOLOGY CO., LTD., Zhejiang (CN)

(72) Inventor: Yumin Dong, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 166 days.

(21) Appl. No.: 17/812,435

(22) Filed: Jul. 13, 2022

(65) Prior Publication Data

US 2022/0353459 A1 Nov. 3, 2022

Related U.S. Application Data

(63) Continuation of application No. PCT/CN2020/137878, filed on Dec. 21, 2020.

(30) Foreign Application Priority Data

Feb. 24, 2020 (CN) .......................... 202010111051.7

(51) Int. Cl.
*H04N 7/08* (2006.01)
*H04N 5/265* (2006.01)
(Continued)

(52) U.S. Cl.
CPC ........... *H04N 7/0806* (2013.01); *H04N 5/265* (2013.01); *H04N 5/92* (2013.01); *H04N 7/10* (2013.01); *H04N 7/181* (2013.01)

(58) Field of Classification Search
CPC ........ H04N 7/0806; H04N 5/265; H04N 5/92; H04N 7/10; H04N 7/181; H04N 5/268; H04N 21/4402
(Continued)

(56) References Cited

U.S. PATENT DOCUMENTS

| 5,790,937 A | 8/1998 | Gutle |
| 8,224,274 B2 | 7/2012 | Gomez et al. |

(Continued)

FOREIGN PATENT DOCUMENTS

| CN | 101867825 A | 10/2010 |
| CN | 104301063 A | 1/2015 |

(Continued)

OTHER PUBLICATIONS

English Translation of Chinese Publication CN 106604097 Apr. 2017 (Year: 2017).*

(Continued)

*Primary Examiner* — Loi H Tran
(74) *Attorney, Agent, or Firm* — METIS IP LLC

(57) ABSTRACT

The present disclosure relates to systems and methods for transmitting a plurality of channels of primary analog signals to at least one terminal device. The method may include combining, by a signal combining device, the plurality of channels of primary analog signals into a combined analog signal. The method may also include transmitting, by the signal combining device, the combined analog signal to a signal dividing device via a cable. The method may further include dividing, by the signal dividing device, the combined analog signal into a plurality of channels of divided analog signals, each of the plurality of channels of divided analog signals corresponding to one of the plurality of channels of primary analog signals. The method may still further include transmitting, by the signal dividing device, the plurality of channels of divided analog signals to the at least one terminal device.

8 Claims, 13 Drawing Sheets

(51) Int. Cl.
  *H04N 5/92* (2006.01)
  *H04N 7/10* (2006.01)
  *H04N 7/18* (2006.01)
(58) Field of Classification Search
  USPC .......................................................... 386/341
  See application file for complete search history.

(56) References Cited

U.S. PATENT DOCUMENTS

| | | | | |
|---|---|---|---|---|
| 2013/0077544 A1* | 3/2013 | Gomez | .................... | H04L 5/08 |
| | | | | 370/328 |
| 2013/0287152 A1 | 10/2013 | Wu et al. | | |
| 2014/0362869 A1 | 12/2014 | Pan et al. | | |
| 2015/0341080 A1* | 11/2015 | Yamanouchi | ............ | H04B 1/74 |
| | | | | 370/228 |
| 2017/0180677 A1 | 6/2017 | Yang | | |
| 2020/0244977 A1* | 7/2020 | Du | ....................... | H04N 19/103 |
| 2020/0402601 A1* | 12/2020 | Linder | ................... | G11C 11/565 |

FOREIGN PATENT DOCUMENTS

| | | |
|---|---|---|
| CN | 107124599 A | 9/2017 |
| CN | 107820038 A | 3/2018 |
| CN | 108964697 A | 12/2018 |
| CN | 110166329 A | 8/2019 |
| CN | 111355930 A | 6/2020 |
| WO | 2019080827 A1 | 5/2019 |
| WO | 2021169527 A1 | 9/2021 |

OTHER PUBLICATIONS

The Extended European Search Report in European Application No. 20921032.7 mailed on Apr. 6, 2023, 8 pages.
International Search Report in PCT/CN2020/137878 mailed on Mar. 22, 2021, 4 pages.
Written Opinion in PCT/CN2020/137878 mailed on Mar. 22, 2021, 5 pages.
First Office Action in Chinese Application No. 202010111051.7 mailed on Jan. 19, 2021, 14 pages.
Zhang, Mingke, Design of Fiber Optic Communication System of Multiplex Video and Data Hybrid Transmission Based on FPGA, Chinese Selected Doctoral Dissertations and Master's Theses Full-Text Databases, 2014, 78 pages.
Sumathi M. et al., Study of Optical Transmission and Digitization of Analog Signals, 2014 International Conference on Control, Instrumentation, Communication and Computational Technologies, 2014, 4 pages.
Zhao, Xiao et al., Adaptive Hybrid Digital-Analog Video Transmission in Wireless Fading Channel, IEEE Transactions on Circuits and Systems for Video Technology, 2016, 14 pages.

* cited by examiner

SYSTEMS AND METHODS FOR SIGNAL TRANSMISSION

CROSS-REFERENCE TO RELATED APPLICATIONS

This application is a Continuation of International Application No. PCT/CN2020/137878, filed on Dec. 21, 2020, which claims priority of Chinese Patent Application No. 202010111051.7, filed on Feb. 24, 2020, the contents of which are hereby incorporated by reference.

TECHNICAL FIELD

This disclosure generally relates to video transmission, and more particularly, relates to systems and methods for transmitting a plurality of channels of analog video signals to a terminal device.

BACKGROUND

With the rapid development and wide application of video surveillance, an increasing number of cameras are used for monitoring conditions of public and/or private spaces. Video signals recorded by cameras within a certain area (e.g., a school, a shopping mall) are usually transmitted, in the form of a plurality of channels of analog signals, to a terminal device for display. Conventionally, each of the plurality of channels of analog signals is transmitted to the terminal device via a cable. In this case, a plurality of cables are needed to transmit the video signals recorded by the cameras within the certain area to the terminal device. However, the cost on establishment and maintenance (e.g., repairing) of the cable connections between the cameras and the terminal device over a long distance may be relatively high, and problems such as wiring aging or damage may result in abnormal video signals. Thus, it is desirable to develop a system and method for transmitting the plurality of channels of analog signals to the terminal device more economically and stably.

SUMMARY

According to a first aspect of the present disclosure, a system for transmitting a plurality of channels of primary analog signals to at least one terminal device is provided. The system may comprise a signal combining device configured to combine the plurality of channels of primary analog signals into a combined analog signal, and transmit the combined analog signal to a signal dividing device via a cable. The system may also comprise the signal dividing device configured to divide the combined analog signal into a plurality of channels of divided analog signals, each of the plurality of channels of divided analog signals corresponding to one of the plurality of channels of primary analog signals, and transmit the plurality of channels of divided analog signals to the at least one terminal device.

In some embodiments, the signal combining device includes a decoding component configured to convert the plurality of channels of primary analog signals into a plurality of primary digital signals; a first processing component configured to combine the plurality of primary digital signals into a combined digital signal; and a modulating component configured to convert the combined digital signal into the combined analog signal.

In some embodiments, to combine the plurality of primary digital signals into the combined digital signal, the first processing component is configured to store the plurality of primary digital signals into a first storage component; and generate the combined digital signal by combining the plurality of primary digital signals stored in the storage component sequentially.

In some embodiments, to combine the plurality of primary digital signals into the combined digital signal, the first processing component is further configured to insert a tag between each two sequential primary digital signals of the plurality of primary digital signals.

In some embodiments, the signal dividing device includes a decoding component configured to convert the combined analog signal received from the signal combining device into a combined digital signal; a second processing component configured to divide the combined digital signal into a plurality of divided digital signals; and at least one modulating component configured to convert the plurality of divided digital signals into the plurality of channels of divided analog signals.

In some embodiments, to divide the combined digital signal into the plurality of divided digital signals, the second processing component is configured to store the combined digital signal into a second storage component; and generate the plurality of divided digital signals based on the combined digital signal stored in the second storage component.

In some embodiments, to generate the plurality of divided digital signals, the second processing component is configured to divide the combined digital signal stored in the second storage component into the plurality of divided digital signals based on tags inserted between each two sequential primary digital signals of the plurality of primary digital signals.

In some embodiments, the signal combining device is further configured to obtain the plurality of channels of primary analog signals from a plurality of signal sources.

In some embodiments, to obtain the plurality of channels of primary analog signals from the plurality of signal sources, the signal combining device is configured to obtain a first plurality of channels of analog signals from the plurality of signal sources; identify a second plurality of channels of analog signals from the first plurality of channels of analog signals, wherein the second plurality of channels of analog signals satisfy at least one preset condition; and designate the second plurality of channels of analog signals as the plurality of channels of primary analog signals.

In some embodiments, the preset condition relates to at least one of a validity or stability of each of the first plurality of channels of analog signals.

According to a second aspect of the present disclosure, a method for transmitting a plurality of channels of primary analog signals to at least one terminal device is provided. The method may comprise combining, by a signal combining device, the plurality of channels of primary analog signals into a combined analog signal; transmitting, by the signal combining device, the combined analog signal to a signal dividing device via a cable; dividing, by the signal dividing device, the combined analog signal into a plurality of channels of divided analog signals, each of the plurality of channels of divided analog signals corresponding to one of the plurality of channels of primary analog signals; and transmitting, by the signal dividing device, the plurality of channels of divided analog signals to the at least one terminal device.

According to a third aspect of the present disclosure, a non-transitory computer readable medium comprising at least one set of instructions for transmitting a plurality of channels of primary analog signals to at least one terminal device is provided. When executed by a video processing device including a signal combining device and a signal dividing device, at least one set of instructions causes the video processing device to perform one or more operations. The one or more operations may comprise combining, by the signal combining device, the plurality of channels of primary analog signals into a combined analog signal; transmitting, by the signal combining device, the combined analog signal to the signal dividing device via a cable; dividing, by the signal dividing device, the combined analog signal into a plurality of channels of divided analog signals, each of the plurality of channels of divided analog signals corresponding to one of the plurality of channels of primary analog signals; and transmitting, by the signal dividing device, the plurality of channels of divided analog signals to the at least one terminal device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
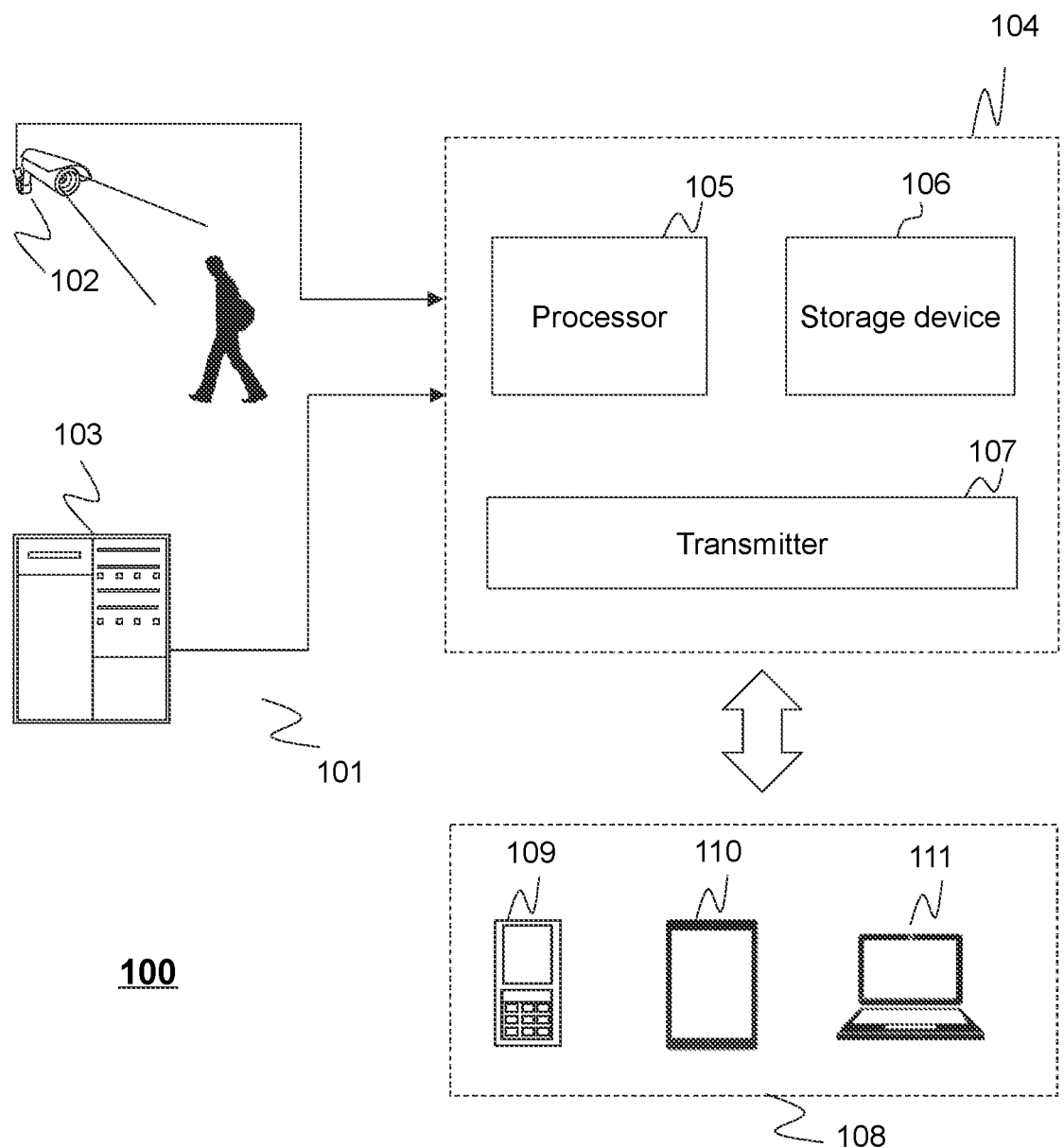
FIG. 1 is a schematic diagram illustrating an exemplary video transmission system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for video transmission. The system may include a signal combining device configured to combine a plurality of channels of primary analog signals into a combined analog signal, and transmit the combined analog signal to a signal separating device via a cable. The cable may be a coaxial cable. The system may also include a signal dividing device configured to divide the combined analog signal into a plurality of channels of divided analog signals, and transmit the plurality of channels of divided analog signals to at least one terminal device. Each of the plurality of channels of divided analog signals may correspond to one of the plurality of channels of primary analog signals. The signal combing device and the signal dividing device may facilitate video signal transmission between a plurality of signal sources and at least one terminal device via a single cable (e.g., a coaxial cable) over a long distance, thus reducing the cost on establishment and maintenance of the communicative connection between the plurality of signal sources and the at least one terminal device while maintaining the quality and real-time performance of the video signals.

FIG. 1 is a schematic diagram illustrating an exemplary video transmission system according to some embodiments of the present disclosure. The video transmission system 100 may be configured to transmit video signals from one or more of video sources to at least one terminal device. As shown, the video transmission system 100 may include one or more of video sources 101, at least one video processing device 104, and a terminal device 108 (or a plurality of terminal devices 108).

The video source(s) 101 may provide a plurality of channels of video signals. The video source(s) 101 may generate the plurality of channels of video signals directly or retrieve the plurality of channels of video signals via one or more video transfer sites. For example, each of the video source(s) 101 may include a camera 102 and/or a media server 103.

The camera 102 may be able to capture a channel of video signal. As used in herein, a channel of video signal may be a video, a stream video, or a plurality of video frames in a video. The video signal may be analog signal or digital signal. In some embodiments, the camera 102 may be an analog camera or a digital camera.

The camera 102 may include a lens, a shutter, a sensor, a processing element, and a storage element. The lens may be an optical device that focuses a light beam by means of refraction to form an image. In some embodiments, the lens may include one or more lenses. The lens may be configured to intake a scene that a user is interested in. An aperture of the lens may refer to the size of the hole through which light passes to reach the sensor. The aperture may be adjustable to adjust the amount of light that passes through the lens. The focal length of the lens may be adjustable to adjust the coverage of the camera 102.

The shutter may be opened to allow light through the lens when an image is captured. The shutter may be controlled manually or automatically by the processing element.

The sensor may be configured to receive light passing through the lens and transform the light signals of the received light into electrical signals. The sensor may include charge coupled device (CCD) and complementary metal-oxide semiconductor (CMOS). The sensor may be configured to detect the scene from the lens, and transform the scene into electronic signals.

The processing element may be configured to process data and/or information relating to the camera 102 and/or control one or more components (e.g., the lens, the shutter) in the camera 102. For example, the processing element may automatically determine target values of exposure parameters of the camera 102 such as an exposure time, an exposure gain, and an aperture. The processing element may also adjust quality images taken the camera 102, such as sharpness of the images.

In some embodiments, the processing element may be local or remote. For example, the processing element may communicate with the camera 102 via a network. As another example, the processing element may be integrated into the camera 102.

The storage element may store data, instructions, and/or any other information. In some embodiments, the storage element may store data obtained from the processing element. For example, the storage element may store captured video signals. In some embodiments, the storage element may store data and/or instructions that the processing element may execute or use to perform exemplary methods described in the present disclosure. In some embodiments, the storage element may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The media sever 103 may be a server (e.g., a computer or a group of computers) for storing, broadcasting, selling, renting, or providing videos. The media server 103 may also include a video processing element (not shown) configured to process the videos from a video source 101 using the methods introduced in the present disclosure.

A video signal provided by a video source 101 may be in the form of a channel of video signal, a data file, a bit stream, etc., for recording, replaying, broadcasting, and displaying of moving visual media, such as a TV program, an animation, a movie, a surveillance or monitoring video, a video shared through a social platform, an advertisement, a live show, a video call, a video conference, or the like, or a combination thereof. A video signal may include a plurality of frames, which may also be referred to as video frames. A frame may be one of a plurality of still images that compose a complete video. By sequentially displaying frames (e.g., images) of a video signal in a rate (frame rate), a video player installed on the terminal device 108 may present the video signal to a user.

To transmit a video signal to the terminal device 108, a video source 101 may send the video signal to the at least one video processing device 104. The at least one video processing device 104 may process the video signal and/or transmit the video signal to the terminal device 108. In some embodiments, the video processing device 104 may include a processor 105, a storage device 106, and a transmitter 107.

The processor 105 may perform various processing operations on the video signals obtained from the signal source(s) 101. Exemplary processing operations may include encoding, decoding, compression, encryption, decryption, denosing, frequency modulating, signal combining, signal dividing, or the like, or any combination thereof. In some embodiments, the processor 105 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. The processor 105 may be a remote device from the video processing device 104 or a local device interpreted in the video processing device 104.

The storage device 106 may be a storage device for storing the video signals or other relevant data/information (e.g., processed video signals). The storage device 106 may also be a remote device from the video processing device 104 or a local device interpreted in the video processing device 104. The storage device 106 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 107 may transmit the processed video signals to the terminal device 108. The transmitter 107 may transmit the processed video signals in response to instructions sent from the video source(s) 101, the processor 105, the terminal device 108, or the like, or a combination thereof. Alternatively or additionally, the transmitter 107 may spontaneously transmit the processed video signals to the terminal device 108. The transmitter 107 may transmit the processed video signals to the terminal device 108 though one or more network connections (wired and/or wireless). In some embodiments, the transmitter 107 may be capable of determining the transmission performance of the network. For example, the transmitter 107 may monitor its data transmitted rate for determining the transmission performance.

The terminal device 108 may receive the transmitted video signals. The terminal device 108 may decode (e.g., through a video player installed on the terminal device 108) the transmitted video signals using a decoding algorithm and display a video to a user.

The terminal device 108 may be various in forms. For example, the terminal device 108 may include a mobile device 109, a tablet computer 110, a laptop computer 111, or the like, or any combination thereof. In some embodiments, the mobile device 109 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™ a Gear VR™, etc.

In some embodiments, the transmitter 107 may transmit the video to the terminal device 108 through a network. The network may include any suitable network that can facilitate a transmission of a video provided by the video source(s) 101 to the terminal 108. Merely by way of example, the network may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network may include one or more network access points. For example, the network may include wired and/or wireless network access points such as base stations and/or internet exchange points through which a video provided by the video source(s) 101 may be transmitted to the terminal device 108.

Figure 2:
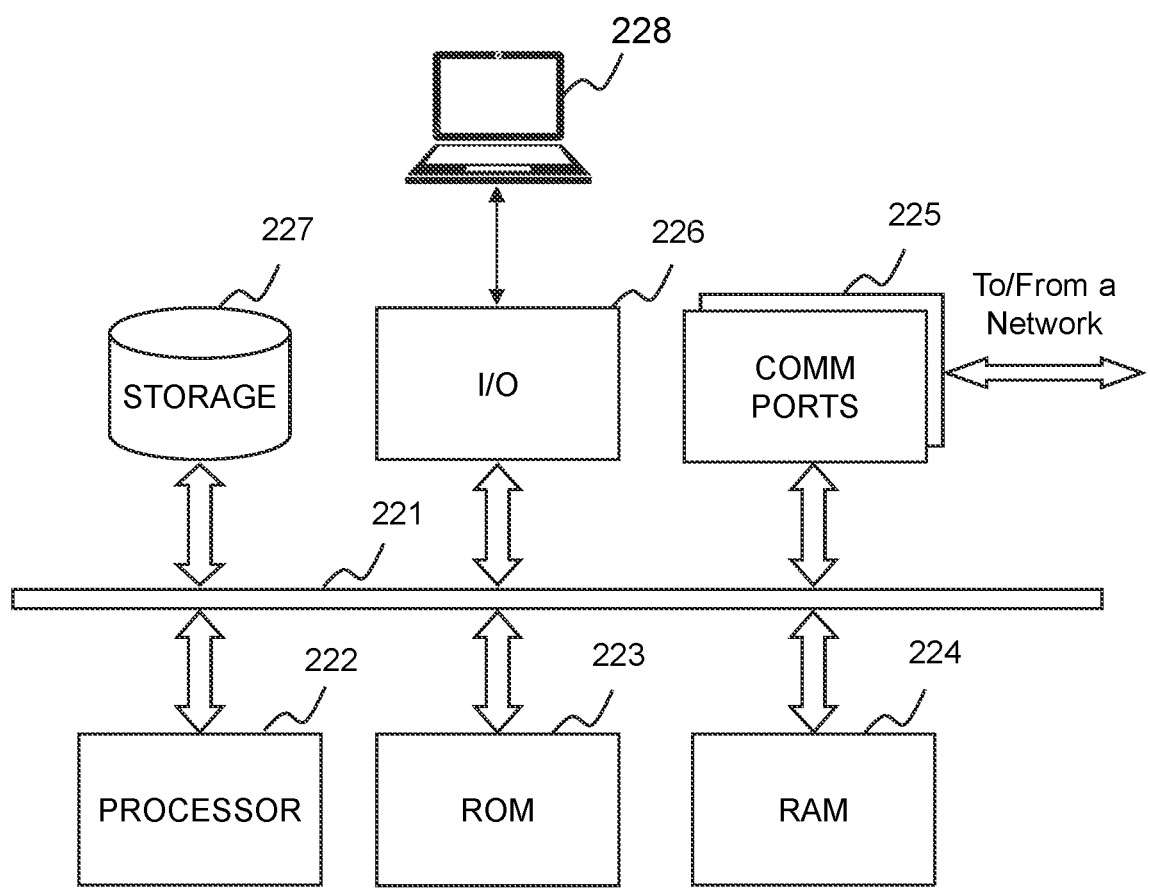
FIG. 2 is a schematic diagram illustrating exemplary components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the media server 103, the processing element of the camera 102, the processing component of the video processing device 104 and/or an electronic device specialized in video processing. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information obtained from the video source(s) 101, the processor 105, the storage device 106, the transmitter 107, the terminal device 108, the network, and/or any other component of the video transmission system 100. In some embodiments, the storage 227 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 227 may store one or more programs and/or instructions to perform exemplary methods described in the present disclosure. For example, the storage 227 may store a program for the processing engine (e.g., the server 103) for determining a regularization item.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network) to facilitate data communications. The communication port 225 may establish connections between the video source 101, the processor 105, the storage device 106, the transmitter 107, the terminal device 108, the network, and/or any other component of the video transmission system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 225 may be and/or include a standardized communication port, such as RS232, RS485, etc. In some embodiments, the communication port 225 may be a specially designed communication port.

Figure 3:
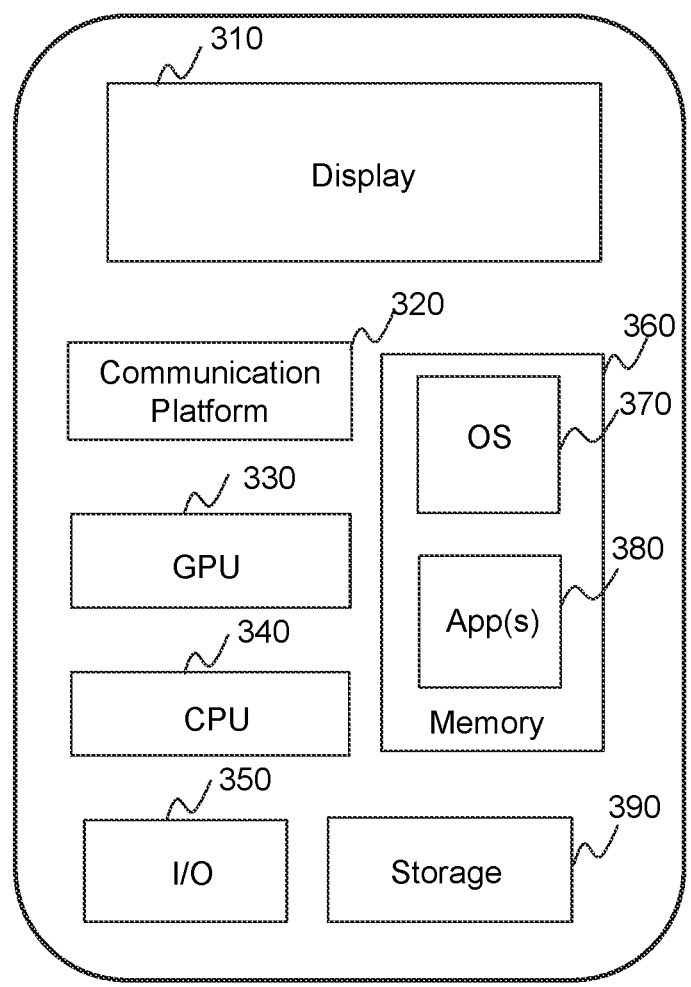
FIG. 3 is a schematic diagram illustrating exemplary components of an exemplary terminal device according to some embodiments of the present disclosure.

FIG. 3 is a schematic diagram illustrating exemplary components of an exemplary terminal device according to some embodiments of the present disclosure. As illustrated in FIG. 3, the terminal device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the terminal device 300. In some embodiments, a mobile operating system 370 (e.g., iOS™, Android™, Windows Phone™) and one or more applications 380 may be loaded into the memory 360 from the storage 390 in order to be executed by the processor 340. The terminal device 300 may be an embodiment of the terminal device 108. The applications 380 may include a video player for receiving a video provided by the video source(s) 101 through the network and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
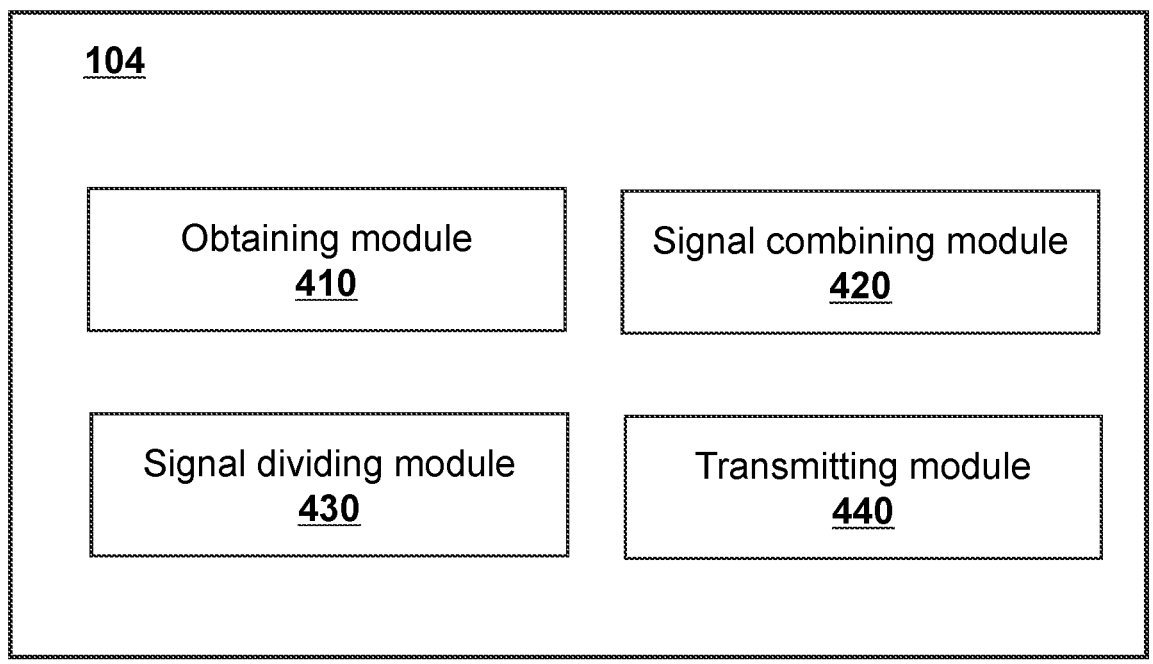
FIG. 4 is a block diagram illustrating an exemplary video processing device according to some embodiments of the present disclosure.

FIG. 4 is a block diagram illustrating an exemplary video processing device according to some embodiments of the present disclosure. As illustrated in FIG. 4, the video processing device 104 may include an obtaining module 410, a signal combining module 420, a signal dividing module 430, and a transmitting module 440.

The obtaining module 410 may obtain data/signals. In some embodiments, the obtaining module 410 may obtain a plurality of channels of primary analog signals. In some embodiments, the plurality of channels of primary analog signals may be obtained from a plurality of signal sources. As used herein, a channel of analog signal may refer to a stream of analog signal. Each of the plurality of signal sources may be a camera (e.g., the camera 102) and/or a media server (e.g., the media server 103). In some embodiments, the plurality of signal sources may be a plurality of cameras (e.g., camera 1, camera 2, and camera N (N is a natural number greater than 2)). The cameras may be an analog camera, a digital camera, a video camera, a security camera, a web camera, a smartphone, a tablet, a laptop, a video gaming console equipped with a web camera, a camera with multiple lenses, etc. In some embodiments, the number or count of channels of the primary analog signals may be the same as the number or count of the signal sources. In some embodiments, the number or count of channels of the primary analog signals may be smaller than the number or count of the signal sources.

The signal combining module 420 may combine a plurality of channels of primary analog signals into a combined analog signal. The combined analog signal may be in the form of a channel of signal. In some embodiments, the operation for combining video signals may be performed on digital signals. The signal combining module 420 may convert the plurality of channels of primary analog signals into a plurality of digital signals before the operation for combining the plurality of video signals is performed. As used herein, a digital signal may also be referred to as a channel of digital signal, which may refer to a stream of digital signals. Each of the plurality of digital signals may correspond to one of the plurality of channels of primary analog signals. The digital signals may also be referred to as primary digital signals. In some embodiments, the plurality of channels of primary analog signals may be converted into the plurality of primary digital signals using, for example, an analog-to-digital (A/D) converter, a decoder, etc.

After the plurality of primary digital signals are obtained, the signal combining module 420 may combine the primary digital signals in a predetermined manner. In some embodiments, the plurality of primary digital signals may be stored in at least one preset area of a storage device (e.g., the storage device 106, the storage 227, the ROM 223, a memory, a cloud storage, etc.). The plurality of primary digital signals may be filled into the at least one preset area in sequence so that a combined digital signal may be generated.

The signal dividing module 430 may divide a combined analog signal into a plurality of channels of divided analog signals. Each of the plurality of channels of divided analog signals may correspond to one of a plurality of channels of primary analog signals obtained from a plurality of signal sources.

In some embodiments, the operation for dividing a video signal may be performed on a digital signal. The signal dividing module 430 may convert the combined analog signal into a combined digital signal before the operation. In some embodiments, the combined digital signal herein may be the same as the combined digital signal obtained from the signal combining module 420. In some embodiments, the combined analog signal may be converted into the combined digital signal using an analog-to-digital (A/D) converter, a decoder, etc.

After the combined digital signal is obtained, the signal dividing module 430 may divide the combined digital signal into a plurality of divided digital signals. In some embodiments, the combined digital signal may be stored in a preset area of a storage device (e.g., the storage device 106, the storage 227, the ROM 223, a cloud storage, etc.). The combined digital signal filled into the preset area may be divided in a predetermined manner so that the plurality of divided digital signals may be generated.

The transmitting module 440 may transmit the plurality of channels of divided analog signals to a video recorder or at least one terminal device. The transmitting module 440 may connect to the at least one terminal device via cables. In some embodiments, the plurality of channels of divided analog signals may be transmitted to the at least one terminal device via a plurality of cables. In some embodiments, the number or count of the cables may be equal to the channels of divided analog signals. Each of the plurality of channels of divided analog signals may be transmitted to the at least one terminal device via a cable.

In some embodiments, the transmitting module 440 may transmit the plurality of channels of divided analog signals to a video recorder (e.g., a DVR). The plurality of channels of divided analog signals may be stored in the video recorder. When a video corresponding to a channel of divided analog signal needs to be provided to (e.g., displayed on) the at least one terminal device, the video recorder may decode the channel of analog signal into a digital signal and forward the digital signal to the at least one terminal device. In some embodiments, the video recorder may transmit the digital signal to the at least one terminal device via a high definition multimedia interface (HDMI) or a video graphics array (VGA).

The modules in the processing device 104 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing device 104 may include a storage module (not shown) configured to store information and/or data (e.g., scanning data, images) associated with the above-mentioned modules.

Figure 5:
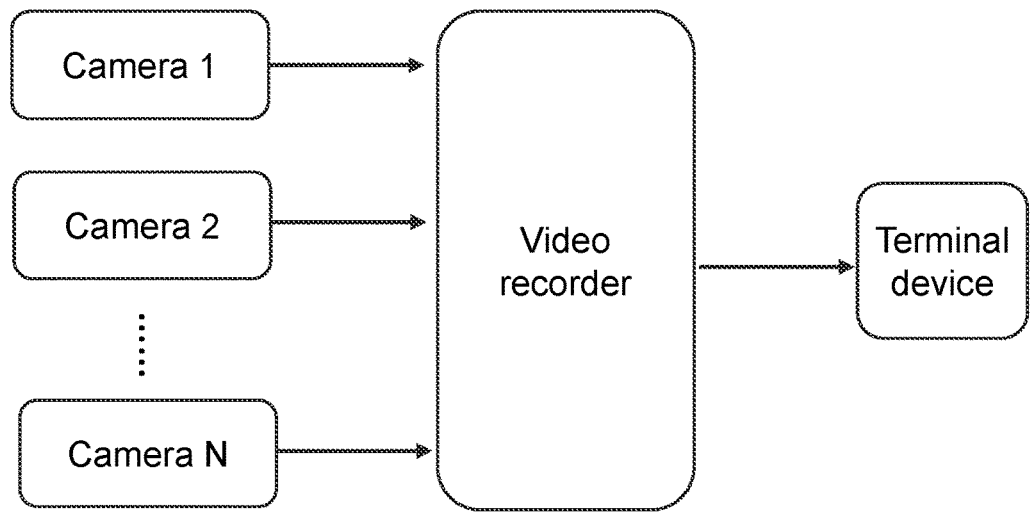
FIGS. 5 and 6 are schematic diagrams illustrate conventional video transmission methods according to some embodiments of the present disclosure.
Figure 6:
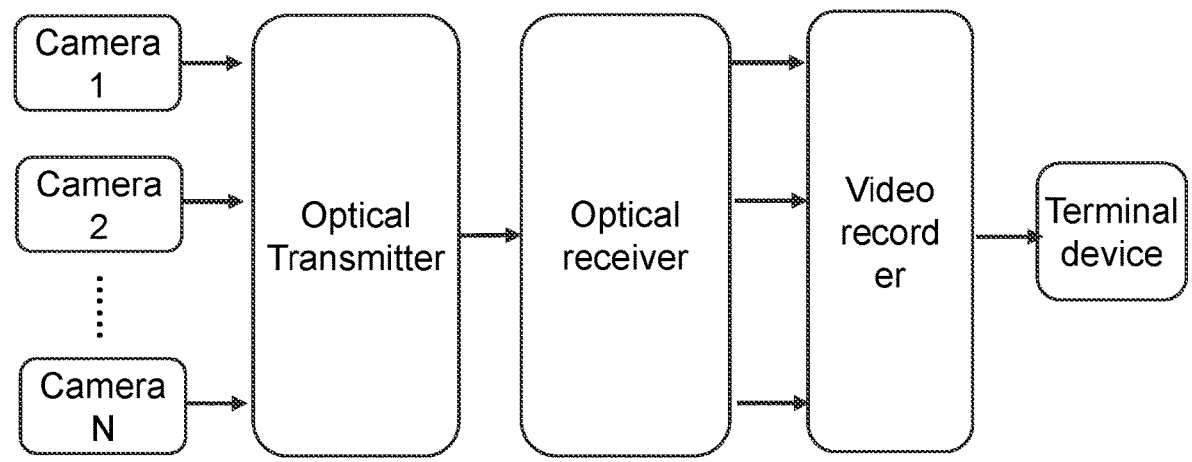

Conventional video transmission methods may be illustrated in FIGS. 5 and 6. As illustrated in FIG. 5, a conventional video transmission method may involve a plurality of signal sources (e.g., the video source(s) 101), a video recorder (e.g., a digital video recorder (DVR)), and a terminal device. The video source(s) 101 may include a plurality of cameras such as camera 1, camera 2, and camera N (N is a natural number greater than 2. The video recorder may receive a plurality of channels of video signals (e.g., analog signals) from the plurality of signal sources via cables. Each of the plurality of signal sources may connect to the video recorder through a cable. The video recorder may store the plurality of channels of video signals and/or decode the video signals (e.g., by converting the analog signals into digital signals). The decoded video signals may be transmitted to the terminal device for display. As for the cable connection, the quality and types of the cables may have direct impacts on the transmitted video signals. In this case, if a distance between a signal source (e.g., camera 1, camera 2, and camera N) and the video recorder is relatively large, the cost for establishing and maintaining (e.g., repairing) the cable connection between the signal source and the video recorder may be relatively high. In addition, problems such as wiring aging or damage may result in abnormal video signals.

As illustrated in FIG. 6, another conventional video transmission method may involve a plurality of signal sources (e.g., camera 1, camera 2, and camera N (N is a natural number greater than 2)), a conventional video transmission device, a video recorder (e.g., a DVR), and a terminal device. The conventional video transmission device may include an optical transmitter, an optical receiver. The optical transmitter may receive a plurality of channels of video signals (e.g., analog signals) from the plurality of signal sources via cables. Each of the plurality of signal sources may connect to the optical transmitter through a cable. The distance between the optical transmitter and each of the plurality of signal sources may be relatively short in comparison to a distance between each of the plurality of signal sources and the video recorder. If the plurality of channels of video signals are analog signals, the optical transmitter may convert the analog signals into digital signals (e.g., by performing an analog-to-digital conversion), and transmit the digital signals to the optical receiver through an optical fiber. The optical receiver may receive optical signals from the optical transmitter and decode the optical signals. After the optical signals are decoded, the plurality of channels of analog signals may be restored by through a digital-to-analog (D/A) conversion. The restored plurality of channels of analog signals may be transmitted to the video recorder through cables. The distance between the optical receiver and the video recorder may be relatively short in comparison to a distance between each of the plurality of signal sources and the video recorder. The video recorder may store the plurality of channels of analog signals and/or decode the analog signals into digital signals. The decoded video signals may be transmitted to a terminal device for display. In this process, the long-distance transmission of the plurality of channels of analog signals from the plurality of signal sources to the terminal device may mainly be implemented on the optical fiber between the optical transmitter and the optical receiver. However, the cost of the optical transmitter and the optical receiver may be relatively high, and the quality and real-time performance of the video signals may be affected in the transmission using the optical transmitter and the optical receiver.

Figure 7:
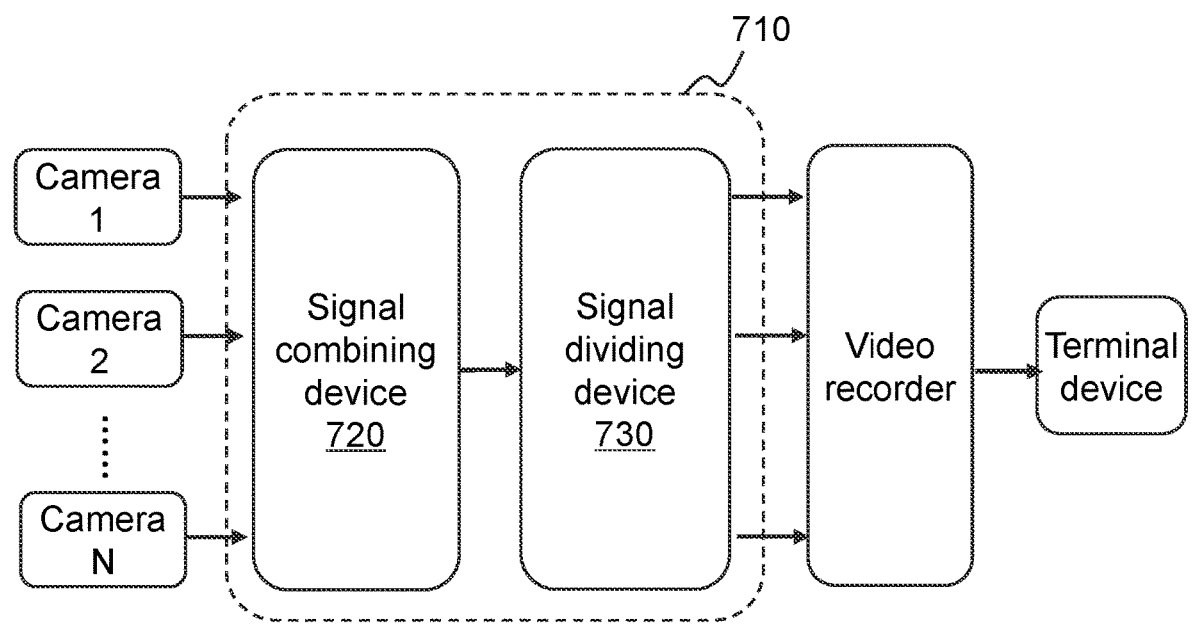
FIG. 7 is a schematic diagram illustrating an exemplary video processing device according to some embodiments of the present disclosure.

FIG. 7 is a schematic diagram illustrating an exemplary video processing device according to some embodiments of the present disclosure. The video processing device 710 may include a signal combining device 720 and a signal dividing device 730. The signal combining device 720 may obtain a plurality of channels of video signals from a plurality of signal sources (e.g., the video source(s) 101) via cables. In some embodiments, each of the plurality of signal sources may be a camera (e.g., the camera 102) and/or a media server (e.g., the media server 103). In some embodiments, the plurality of signal sources may be a plurality of cameras (e.g., camera 1, camera 2, and camera N (N is a natural number greater than 2)). In some embodiments, the plurality of channels of video signals may be analog signals. The signal combining device 720 may be configured to combine the plurality of channels of analog signals into a combined analog signal. The signal combining device 720 may transmit the combined analog signal to the signal dividing device 730. In some embodiments, the combined analog signal may be transmitted to the signal dividing device 730 via a cable. The cable may include a coaxial cable, a copper alloy cable, an aluminum alloy cable, a metal cable, a nano cable, a fire-resistant cable, a shielded cable, a compensation cable, a high-temperature cable, etc.

The signal dividing device 730 may be configured to divide the combined analog signal into a plurality of channels of divided analog signals. Each of the plurality of channels of divided analog signals may correspond to a channel of analog signal obtained from a signal source. In some embodiments, the plurality of channels of divided analog signals may be the same as the plurality of channels of analog signals obtained from the plurality of signal sources. The plurality of channels of divided analog signals may be transmitted to a video recorder (e.g., a DVR). The video recorder may store the plurality of channels of divided analog signals and/or decode the analog signals into digital signals. The decoded video signals may be transmitted to a terminal device (e.g., the terminal device 108 or the terminal device 300) for display.

The distance between the signal combining device 720 and each of the plurality of signal sources may be relatively short in comparison to a distance between each of the plurality of signal sources and the video recorder. The distance between the signal dividing device 730 and the video recorder may be relatively short in comparison to a distance between each of the plurality of signal sources and the video recorder. The signal combining device 720 and the signal dividing device 730 may facilitate the transmission of the plurality of channels of video signals mainly on a cable between the signal combining device 720 and the signal dividing device 730. In comparison with the conventional video transmission methods, the cost for establishing and maintaining the connection between the plurality of signal sources and the terminal device may be reduced and the quality and real-time performance of the video signals may be improved.

Figure 8:
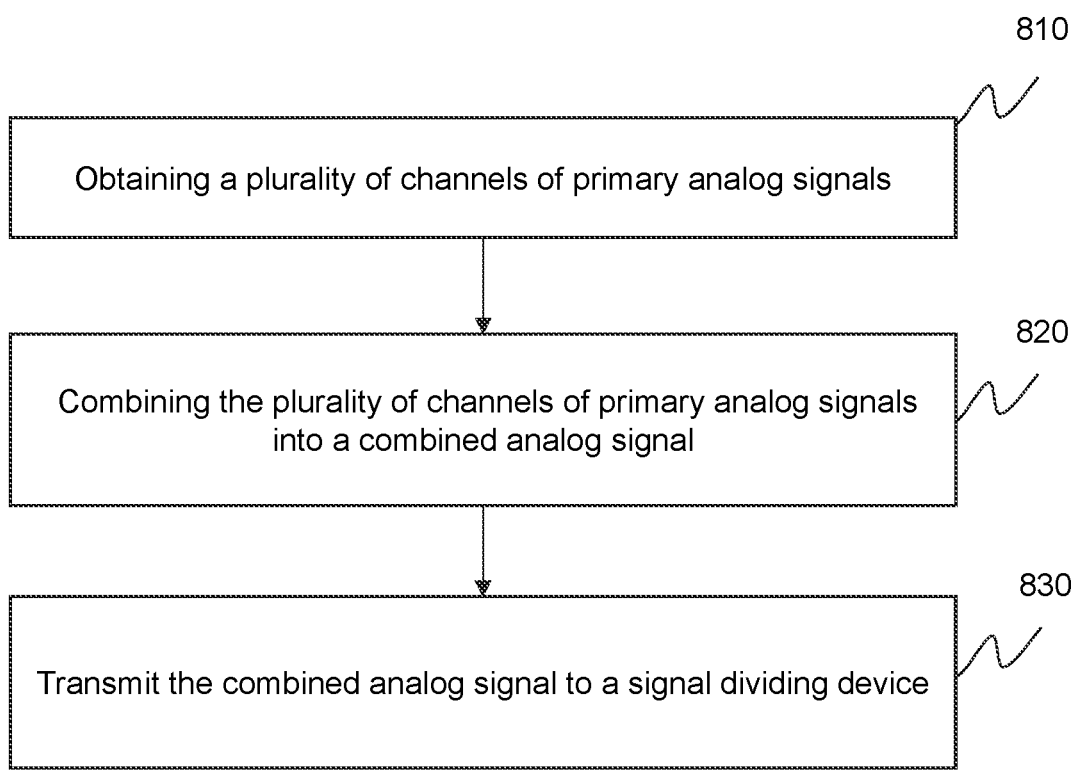
FIG. 8 is a flow chart illustrating an exemplary process for combining a plurality of channels of analog signals into a combined analog signal according to some embodiments of the present disclosure.

FIG. 8 is a flow chart illustrating an exemplary process for combining a plurality of channels of analog signals into a combined analog signal according to some embodiments of the present disclosure. In some embodiments, the process 800 may be implemented on the video transmission system 100 as illustrated in FIG. 1. For example, the process 800 may be stored in a storage medium (e.g., the storage device 106 of the video processing device 104, the storage 227 of the computing device 220) as a form of instructions, and invoked and/or executed by the video processing device 104. The operations in the process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below may not be intended to be limiting. In some embodiments, the process 800 may be performed by the signal combining module 420 of the video processing device 400 or the signal combining device 720 of the video processing device 710.

In 810, the obtaining module 410 or the signal combining device 720 may obtain a plurality of channels of primary analog signals.

In some embodiments, the plurality of channels of primary analog signals may be obtained from a plurality of signal sources. As used herein, a channel of analog signal may refer to a stream of analog signal. Each of the plurality of signal sources may be a camera (e.g., the camera 102) and/or a media server (e.g., the media server 103). In some embodiments, the plurality of signal sources may be a plurality of cameras (e.g., camera 1, camera 2, and camera N (N is a natural number greater than 2)). The cameras may be an analog camera, a digital camera, a video camera, a security camera, a web camera, a smartphone, a tablet, a laptop, a video gaming console equipped with a web camera, a camera with multiple lenses, etc. In some embodiments, the number or count of channels of the primary analog signals may be the same as the number or count of the signal sources. In some embodiments, the number or count of channels of the primary analog signals may be smaller than the number or count of the signal sources.

In some embodiments, each of the plurality of channels of primary analog signals may be transmitted from a signal source to the signal combining device 720 via a cable. The cable may include a coaxial cable, a copper alloy cable, an aluminum alloy cable, a nano cable, a fire-resistant cable, a shielded cable, a compensation cable, a high-temperature cable, etc. In some embodiments, the cable may be a general cable, for example, the coaxial cable. The use of the coaxial cable may reduce the cost for establishing and maintaining the cable connection between each of the plurality of signal sources and the signal combining device 720. It should be noted that the cable connections between the plurality of signal sources and the signal combining device 720 are merely for illustration purposes, and not intended to be limiting. In some cases, at least a portion of the cables connecting the plurality of signal sources and the signal combining device 720 may be replaced by other wired or wireless connections, such as an optical cable, a hybrid cable, a Local Area Network (LAN), a Wide Area Network (WAN), a Bluetooth, a ZigBee, a Near Field Communication (NFC), or the like, or any combination thereof.

In some embodiments, the obtaining module 410 or the signal combining device 720 may obtain a first plurality of channels of analog signals from the plurality of signal sources. The obtaining module 410 or the signal combining device 720 may identify a second plurality of channels of analog signals from the first plurality of channels of analog signals. The number or count of the second plurality of channels of analog signals may be smaller than or equal to the number or count of the first plurality of channels of analog signals. In some embodiments, the second plurality of channels of analog signals may be a portion of the first plurality of channels of analog signals that satisfy at least one preset condition.

The preset condition may be or relate to, for example, a stability, a validity, etc., of each of the first plurality of channels of analog signals. In some embodiments, the obtaining module 410 or the signal combining device 720 may determine a stability of each of the first plurality of channels of analog signals. To determine a stability of a channel of analog signal, the obtaining module 410 or the signal combining device 720 may determine one or more features of the channel of analog signal. The stability of the channel of analog signal may be determined based on the one or more features of the channel of analog signal. The one or more features of the channel of analog signal may be, for example, a line synchronization time, a frame synchronization time, a characteristic sequence associated with frame blanking, etc. The obtaining module 410 or the signal combining device 720 may determine whether the channel of analog signal is continuous based on the one or more features. For example, the obtaining module 410 or the signal combining device 720 may determine whether the channel of analog signal is continuous by comparing a value of each of at least one of the one or more features with a corresponding threshold. If the channel of analog signal is continuous (e.g., a value of each of at least one of the one or more features is greater than or equal to a corresponding threshold), it may indicate that the channel of analog signal is stable. Otherwise, it may indicate that the channel of analog signal is unstable. In some embodiments, if the channel of analog signal is stable, the channel of analog signal may be determined as a channel of the primary analog signal. In this case, all the plurality of channels of primary analog signals are stable. It should be noted that the one or more features exemplified is merely for illustration purposes, and not intended to be limiting.

The obtaining module 410 or the signal combining device 720 may also determine a validity of each of the first plurality of channels of analog signals. In some embodiments, to determine a validity of a channel of analog signal, the obtaining module 410 or the signal combining device 720 may determine a combining table of analog signals of different frame rates. The combining table of analog signals of different frame rates may include various combinations of analog signals of different frame rates. The combining table may be determined by a user, according to default settings of the video transmission system 100. The obtaining module 410 or the signal combining device 720 may determine whether a frame rate of a channel of analog signal is matched to a record in the combining table. If the frame rate of the channel of analog signal is matched to a record in the combining table, it may indicate that the channel of analog signal is valid. Otherwise, it may indicate that the channel of analog signal is invalid. In some embodiments, if the channel of analog signal is valid, the channel of analog signal may be determined as a channel of the primary analog signal. In this case, all the plurality of channels of primary analog signals are valid. In some embodiments, the obtaining module 410 or the signal combining device 720 may determine identify the second plurality of channels of analog signals from the first plurality of channels of analog signals based on both the stability and the validity of each of the first plurality of channels of analog signals. The identified second plurality of channels of analog signals may be designated as the plurality of channels of primary analog signals.

In 820, the signal combining module 420 or the signal combining device 720 may combine the plurality of channels of primary analog signals into a combined analog signal. The combined analog signal may be in the form of a channel of signal.

In some embodiments, the operation for combining video signals may be performed on digital signals. The signal combining module 420 or the signal combining device 720 may convert the plurality of channels of primary analog signals into a plurality of digital signals before the operation for combining the plurality of video signals is performed. As used herein, a digital signal may also be referred to as a channel of digital signal, which may refer to a stream of digital signals. Each of the plurality of digital signals may correspond to one of the plurality of channels of primary analog signals. The digital signals may also be referred to as primary digital signals. In some embodiments, the plurality of channels of primary analog signals may be converted into the plurality of primary digital signals using, for example, an analog-to-digital (A/D) converter, a decoder, etc.

After the plurality of primary digital signals are obtained, the signal combining module 420 or the signal combining device 720 may combine the primary digital signals in a predetermined manner. In some embodiments, the plurality of primary digital signals may be stored in at least one preset area of a storage device (e.g., the storage device 106, the storage 227, the ROM 223, a memory, a cloud storage, etc.). The plurality of primary digital signals may be filled into the at least one preset area in sequence so that a combined digital signal may be generated.

In some embodiments, the plurality of primary digital signals may be filled into an area of a storage device according to a certain order so as to form the combined digital signal. The certain order may be set by a user, according to default settings of the video transmission system 100, etc. In some embodiments, a tag may be generated and inserted between each two sequential primary digital signals of the plurality of primary digital signals. A tag may be used to separate two sequential primary digital signals from each other. The combined digital signal may include the plurality of primary digital signals and the multiple tags. Merely for illustration, after a first primary digital signal is filled into a first storage unit and a second storage unit in the area of the storage device, a first tag may be generated and inserted into a third storage unit subsequent to second storage unit. The signal combining module 420 or the signal combining device 720 may further fill a second primary digital signal into a fourth storage unit in the area of the storage device. Then a second tag may be generated and inserted into a fifth storage unit subsequent to fourth storage unit.

In some embodiments, each of the plurality of primary digital signals may be filled into a discrete area in the storage device. A combined digital signal may be generated by combining the plurality of primary digital signals in the discrete areas in the storage device. At least one blank area may be disposed between each two discrete area. In some embodiments, information (e.g., a location, a size, etc.) of each discrete area storing a primary digital signal may be obtained. The combined digital signal may include the plurality of primary digital signals and the information of the discrete areas storing the plurality of primary digital signals.

In some embodiments, other processing operations (e.g., compression, encryption, denoising, etc.) may further be performed on the plurality of primary digital signals and/or the combined digital signal. For example, the combined digital signal may be encoded using an algorithm for video compression so that the cost (e.g., time cost, resource cost, etc.) for transmitting the video signal may be significantly reduced.

According to transmission characteristics of video signals, the combined digital signal may be converted into a combined analog signal. The combined digital signal may be converted into the combined analog signal using, for example, a D/A converter, a modulator, etc.

In 830, the transmitting module 440 or the signal combining device 720 may transmit the combined analog signal to a signal dividing device (e.g., the signal dividing device 730). The signal dividing device may divide the combined analog signal into a plurality of divided analog signals. The signal combining device 720 may connect to the signal dividing device 730 via a cable.

It is understood that a resolution of the combined analog signal after synthesis may be a sum of resolutions of the plurality of channels of analog signals. For example, if a resolution of each of four channels of analog signals is 1 million pixels, the resolution of the combined analog signal may be 4 million pixels. As another example, if a resolution of a first channel of analog signal is 1 million pixels, a resolution of a second channel of analog signal is 2 million pixels, a resolution of a third channel of analog signal is 3 million pixels, a resolution of a fourth channel of analog signal is 4 million pixels, the resolution of the combined analog signal may be 10 million pixels.

Figure 9:
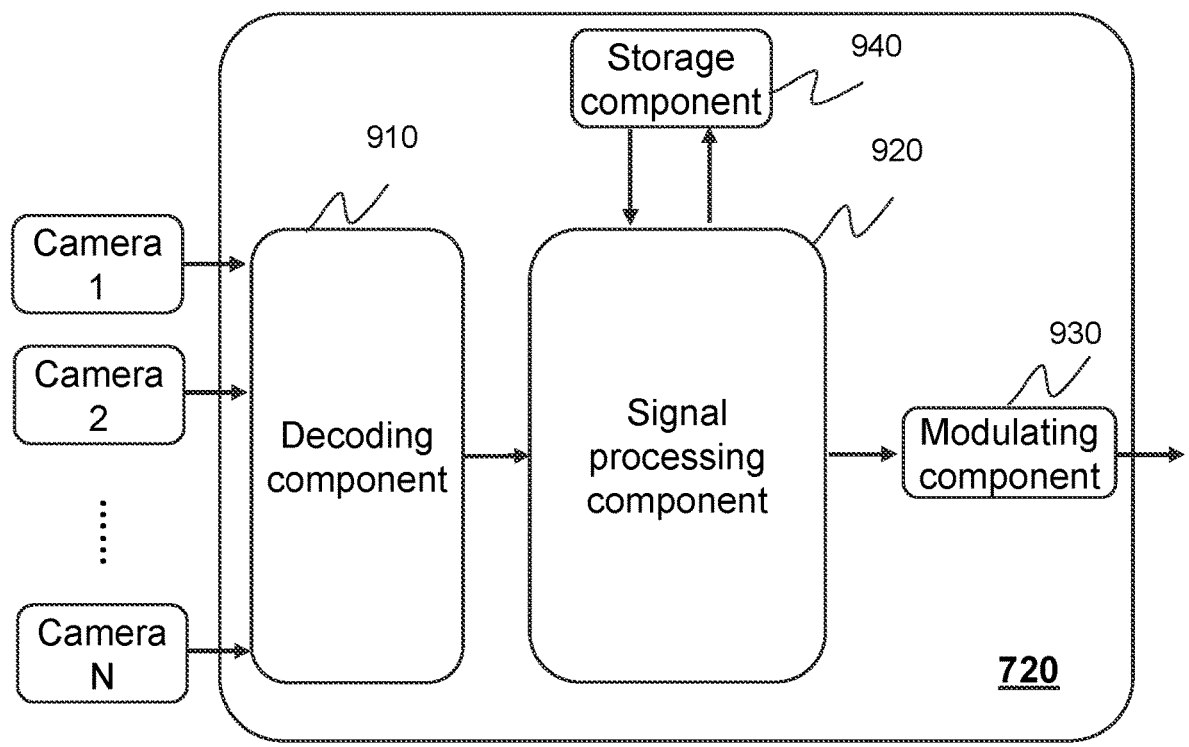
FIG. 9 illustrates exemplary components of the signal combining device 720 according to some embodiments of the present disclosure.

FIG. 9 illustrates exemplary components of the signal combining device 720 according to some embodiments of the present disclosure. In some embodiments, the signal combining device 720 may include a decoding component 910, a signal processing component 920, a modulating component 930, and a storage component 940. In some embodiments, the operation 820 of the process 800 as illustrated in FIG. 8 for combining a plurality of channels of primary analog signals into a combined analog signal may be performed by the components of the signal combining device 720.

The decoding component 910 may be configured to convert an analog signal into a digital signal. In some embodiments, the decoding component 910 convert the plurality of channels of primary analog signals obtained in 810 into a plurality of primary digital signals. The decoding component 910 may be or include a decoder, an A/D converter, etc. In some embodiments, the decoding component 910 may include a plurality of A/D converters. In some embodiments, the number or count of the A/D converters may be equal to the number or count of the channels of primary analog signals. Each of the plurality of A/D converters may convert a channel of primary analog signal into a primary digital signal. In some embodiments, the number or count of the A/D converters may be smaller than the number or count of the channels of primary analog signals. At least one of the plurality of A/D converters may convert two or more channels of primary analog signals into respective primary digital signals.

The signal processing component 920 may be configured to process digital signals according to various signal processing algorithms or in a predetermined signal processing manner. In some embodiments, the signal processing component 920 may obtain the plurality of primary digital signals from the decoding component 910 and combine the plurality of primary digital signals into a combine digital signal.

To generate the combine digital signal, the signal processing component 920 may fill the plurality of primary digital signals into the storage component 940. The plurality of primary digital signals may be filled into at least one preset area of the storage component 940. The plurality of primary digital signals may be filled into the at least one preset area in sequence according to a certain order so that a combined digital signal may be generated. For example, the plurality of primary digital signals may be continuously filled into an area according to a certain order so as to form the combined digital signal. In such a case, the signal processing component 920 may generate multiple tags which are used to separate each two sequential primary digital signals of the plurality of primary digital signals from each other. The tags may be inserted between each two sequential primary digital signals of the plurality of primary digital signals. The combined digital signal may include the plurality of primary digital signals and the multiple tags. As another example, each of the plurality of primary digital signals may be filled into a discrete area in the storage device. A combined digital signal may be generated by combining the plurality of primary digital signals in the discrete areas in the storage device. In some embodiments, information (e.g., a location, a size, etc.) of each discrete area storing a primary digital signal may be obtained. The combined digital signal may include the plurality of primary digital signals and the information of the discrete areas storing the plurality of primary digital signals.

In some embodiments, the signal processing component 920 may perform other processing operations (e.g., compression, encryption, denoising, etc.) on the plurality of primary digital signals and/or the combined digital signal. For example, the signal processing component 920 may encode the combined digital signal using an algorithm for video compression so that the cost (e.g., time cost, resource cost, etc.) for transmitting the video signal may be significantly reduced.

The signal processing component 920 may be or include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The modulating component 930 may be configured to convert a digital signal into an analog signal. In some embodiments, the modulating component 930 may obtain the combined digital signal from the signal processing component 920 and convert the combined digital signal into the combined analog signal. The modulating component 930 may be or include a modulator, a D/A converter.

The storage component 940 may store data/information. In some embodiments, the storage component 940 may store the plurality of primary digital signals and the combined digital signal. The storage component 940 may be or include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

Figure 10:
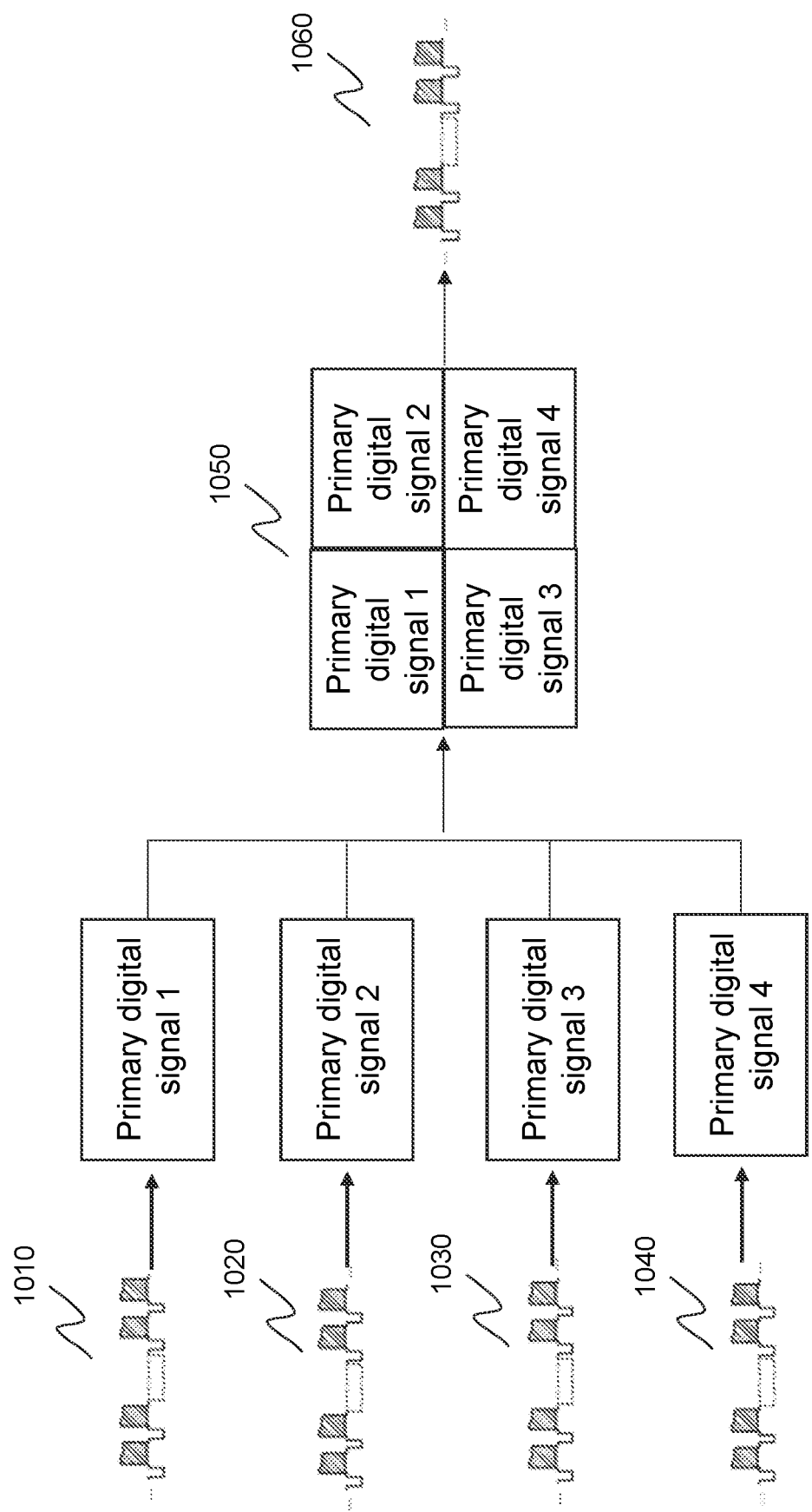
FIG. 10 is a schematic diagram illustrating an exemplary process for combining a plurality of channels of primary analog signals into a combined analog signal according to some embodiments of the present disclosure.

FIG. 10 is a schematic diagram illustrating an exemplary process for combining a plurality of channels of primary analog signals into a combined analog signal. As illustrated in FIG. 10, four channels of primary analog signals 1010-1040 may be obtained. The four channels of primary analog signals may be converted (e.g., using four decoders) into four primary digital signals, respectively. The four primary digital signals may include a primary digital signal 1, a primary digital signal 2, a primary digital signal 3, and a primary digital signal 4. The four primary digital signals may be filled into at least one preset area in a storage device 1050 so as to be combined into a combined digital signal. Then the combined digital signal may be converted (e.g., using a modulator) into a combined analog signal 1060. The combined analog signal 1060 may be transmitted to a signal dividing device (e.g., the signal dividing device 730) over a relatively long distance via a cable. The cable may be, for example, a coaxial cable.

In some embodiments, the primary digital signals may be filled the primary digital signal 1, the primary digital signal 2, the primary digital signal 3, and the primary digital signal 4 continuously into the storage device in sequence. If the signal dividing device divides the combined analog signal into the primary digital signal 1, the primary digital signal 2, the primary digital signal 3, and the primary digital signal 4 in sequence, the tags may be omitted. It should be noted that the marshalling sequence the primary digital signal 1, the primary digital signal 2, the primary digital signal 3, and the primary digital signal 4 is provided for illustration purposes, and not intended to be limiting. In some embodiments, other marshalling sequences such as the primary digital signal 1, the primary digital signal 3, the primary digital signal 2, and the primary digital signal 4 may be used.

Figure 11:
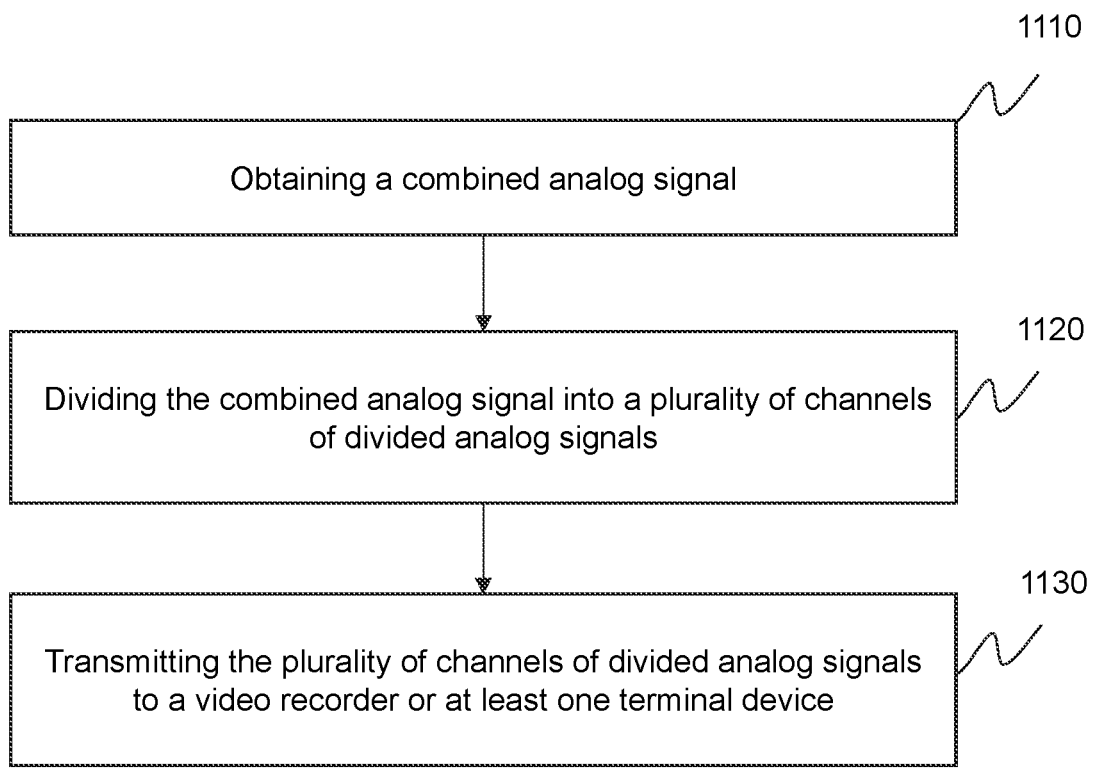
FIG. 11 is a flow chart illustrating an exemplary process for dividing a combined analog signal into a plurality of channels of divided analog signals according to some embodiments of the present disclosure.

FIG. 11 is a flow chart illustrating an exemplary process for dividing a combined analog signal into a plurality of channels of divided analog signals according to some embodiments of the present disclosure. In some embodiments, the process 1100 may be implemented on the video transmission system 100 as illustrated in FIG. 1. For example, the process 1100 may be stored in a storage medium (e.g., the storage device 106 of the video processing device 104, the storage 227 of the computing device 220) as a form of instructions, and invoked and/or executed by the video processing device 104. The operations in the process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below may not be intended to be limiting. In some embodiments, the process 1100 may be performed by the signal dividing module 430 of the video processing device 400 or the signal dividing device 730 of the video processing device 710.

In 1110, the obtaining module 410 or the signal dividing device 730 may obtain a combined analog signal.

In some embodiments, the combined analog signal may be obtained from the signal combining device 720. In some embodiments, the combined analog signal may be transmitted from the signal combining device 720 to the signal dividing device 730 via a cable. The cable may include a coaxial cable, a copper alloy cable, an aluminum alloy cable, a nano cable, a fire-resistant cable, a shielded cable, a compensation cable, a high-temperature cable, etc. In some embodiments, the cable may be a general cable, for example, the coaxial cable. The use of the coaxial cable may reduce the cost for establishing and maintaining the cable connection between the signal combining device 720 and the signal dividing device 730 over a long distance (e.g., several hundred meters to several kilometers).

In 1120, the signal dividing module 430 or the signal dividing device 730 may divide the combined analog signal into a plurality of channels of divided analog signals. Each of the plurality of channels of divided analog signals may correspond to one of a plurality of channels of primary analog signals obtained from a plurality of signal sources.

In some embodiments, the operation for dividing a video signal may be performed on a digital signal. The signal dividing module 430 or the signal dividing device 730 may convert the combined analog signal into a combined digital signal before the operation. In some embodiments, the combined digital signal herein may be the same as the combined digital signal obtained in 820 of the process 800 in FIG. 8. In some embodiments, the combined analog signal may be converted into the combined digital signal using an analog-to-digital (A/D) converter, a decoder, etc.

After the combined digital signal is obtained, the signal dividing module 430 or the signal dividing device 730 may divide the combined digital signal into a plurality of divided digital signals. In some embodiments, the combined digital signal may be stored in a preset area of a storage device (e.g., the storage device 106, the storage 227, the ROM 223, a cloud storage, etc.). The combined digital signal filled into the preset area may be divided in a predetermined manner so that the plurality of divided digital signals may be generated.

As mentioned above, in some embodiments, the combined digital signal generated in 820 of the process 800 in FIG. 8 may include a plurality of primary digital signals and multiple tags. Each of the multiple tags may be inserted between each two sequential primary digital signals. The signal dividing module 430 or the signal dividing device 730 may divide the combined digital signal into a plurality of portions according to the multiple tags. Each of the plurality of portions of the combined digital signal may be designated as one of the plurality of divided digital signals. For example, if the combined digital signals includes M primary digital signals and M-1 tags (M may be a natural number larger than 1), the signal dividing module 430 or the signal dividing device 730 may divide the combined digital signal by segmenting the combined digital signal into M portions according to the M-1 tags. Each of the M portions of the combined digital signal may be designated as one of the plurality of divided digital signals.

In some other embodiments, the combined digital signal generated in 820 of the process 800 in FIG. 8 may include the plurality of primary digital signals and information of discrete areas storing the plurality of primary digital signals. Similarly, the signal dividing module 430 or the signal dividing device 730 may divide the combined digital signal into a plurality of portions according to the information of discrete areas. Each of the plurality of portions of the combined digital signal may be designated as one of the plurality of divided digital signals.

In some embodiments, other processing operations (e.g., decompression, decryption, denoising, etc.) may further be performed on the combined digital signal and/or the plurality of divided digital signals. For example, the combined digital signal may be decoded using an algorithm for video decompression.

According to the transmission characteristics of video signals, each of the plurality of divided digital signals may be converted into a channel of divided analog signal. In some embodiments, the plurality of divided digital signals may be converted into a plurality of channels of divided analog signals using, for example, a D/A converter, a modulator, etc. Each of the plurality of channels of divided analog signals may correspond to one of a plurality of channels of primary analog signals obtained from a plurality of signal sources.

In 1130, the transmitting module 440 or the signal dividing device 730 may transmit the plurality of channels of divided analog signals to a video recorder or at least one terminal device.

The signal dividing device 730 may connect to the at least one terminal device via cables. In some embodiments, the plurality of channels of divided analog signals may be transmitted to the at least one terminal device via a plurality of cables. In some embodiments, the number or count of the cables may be equal to the channels of divided analog signals. Each of the plurality of channels of divided analog signals may be transmitted to the at least one terminal device via a cable.

The cable may include, for example, a coaxial cable, a copper alloy cable, an aluminum alloy cable, a nano cable, a fire-resistant cable, a shielded cable, a compensation cable, a high-temperature cable, etc. In some embodiments, the cable may be a general cable, for example, the coaxial cable. The use of the coaxial cable may reduce the cost for establishing and maintaining the cable connection between the signal dividing device 730 and the video recorder or the at least one terminal device. It should be noted that the cable connections between the signal dividing device 730 and the video recorder or the at least one terminal device are merely for illustration purposes, and not intended to be limiting. In some cases, at least a portion of the cables connecting the signal dividing device 730 to the video recorder or the at least one terminal device may be replaced by other wired or wireless connections, such as an optical cable, a hybrid cable, a Local Area Network (LAN), a Wide Area Network (WAN), a Bluetooth, a ZigBee, a Near Field Communication (NFC), or the like, or any combination thereof.

In some embodiments, the transmitting module 440 or the signal dividing device 730 may transmit the plurality of channels of divided analog signals to a video recorder (e.g., a DVR). The plurality of channels of divided analog signals may be stored in the video recorder. When a video corresponding to a channel of divided analog signal needs to be provided to (e.g., displayed on) the at least one terminal device, the video recorder may decode the channel of analog signal into a digital signal and forward the digital signal to the at least one terminal device. In some embodiments, the video recorder may transmit the digital signal to the at least one terminal device via a high definition multimedia interface (HDMI) or a video graphics array (VGA).

Figure 12:
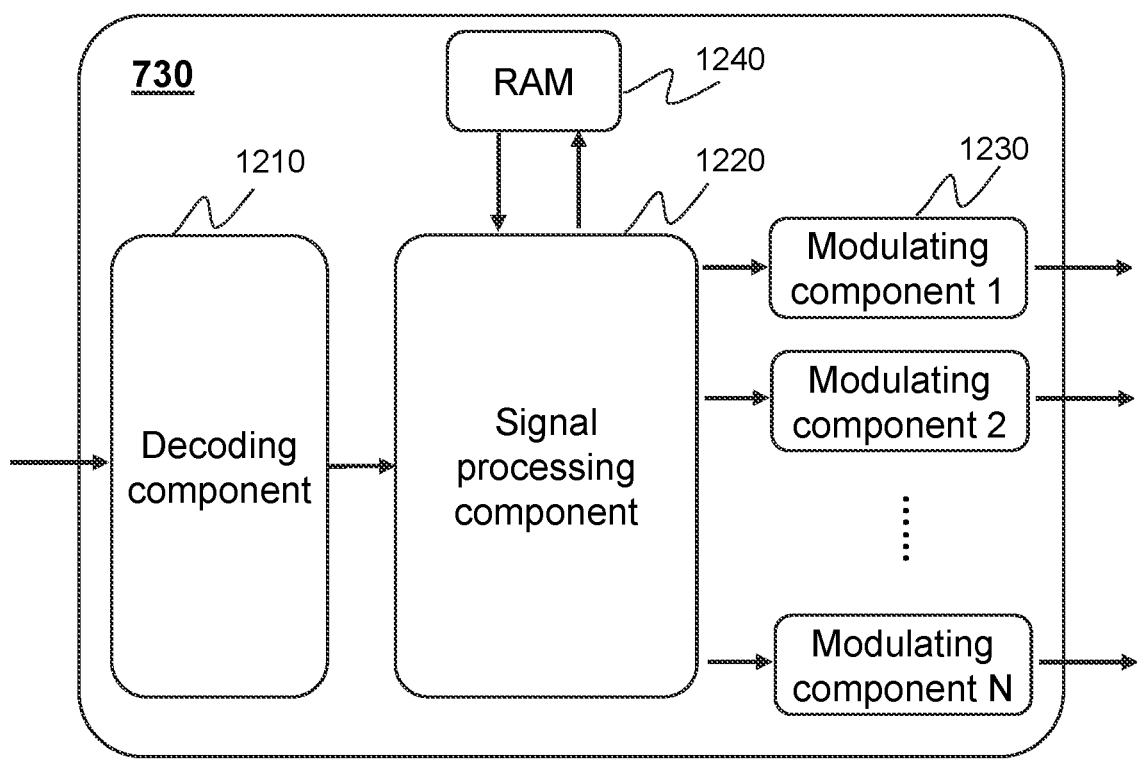
FIG. 12 illustrates exemplary components of the signal dividing device 730 according to some embodiments of the present disclosure.

FIG. 12 illustrates exemplary components of the signal dividing device 730 according to some embodiments of the present disclosure. In some embodiments, the signal dividing device 730 may include a decoding component 1210, a signal processing component 1220, a modulating component 1230, and a storage component 1240. In some embodiments, the operation 1120 of the process 1100 as illustrated in FIG. 11 for dividing a combined analog signal into a plurality of channels of divided analog signals may be performed by the components of the signal dividing device 730.

The decoding component 1210 may be configured to convert an analog signal into a digital signal. In some embodiments, the decoding component 1210 convert the combined analog signal obtained in 1110 into a combined digital signal. The decoding component 1210 may be or include a decoder, an A/D converter, etc.

The signal processing component 1220 may be configured to process the combined digital signal according to various signal processing algorithms or in a predetermined signal processing manner. In some embodiments, the signal processing component 1220 may obtain the combined digital signal from the decoding component 1210 and divide the combined digital signal into a plurality of divided digital signals.

To generate the plurality of divided digital signals, the signal processing component 1220 may fill the combined digital signal into the storage component 1240. The combined digital signal may be filled into a preset area of the storage component 1240. The combined digital signal filled into the preset area may be divided in a predetermined manner so that the plurality of divided digital signals may be generated.

In some embodiments, the combined digital signal generated by the signal combining device 920 may include a plurality of primary digital signals and multiple tags. Each of the multiple tags may be inserted between each two sequential primary digital signals. The signal processing component 1220 may divide the combined digital signal into a plurality of portions according to the multiple tags. Each of the plurality of portions of the combined digital signal may be designated as one of the plurality of divided digital signals. In some other embodiments, the combined digital signal generated by the signal combining device 920 may include the plurality of primary digital signals and information of discrete areas storing the plurality of primary digital signals. Similarly, the signal processing component 1220 may divide the combined digital signal into a plurality of portions according to the information of discrete areas. Each of the plurality of portions of the combined digital signal may be designated as one of the plurality of divided digital signals.

In some embodiments, the signal processing component 1220 may perform other processing operations (e.g., decompression, decryption, denoising, etc.) on the plurality of divided digital signals and/or the combined digital signal.

The signal processing component 1220 may be or include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The modulating component 1230 may be configured to convert a digital signal into an analog signal. In some embodiments, the modulating component 1230 may obtain the plurality of divided digital signals from the signal processing component 1220 and convert the plurality of divided digital signals into a plurality of channels of divided analog signal. Each of the plurality of channels of divided analog signals may correspond to one of a plurality of channels of primary analog signals obtained from a plurality of signal sources. The modulating component 1230 may be or include a modulator, a digital-to-analog (D/A) converter.

In some embodiments, the modulating component 1230 may include a plurality of D/A converters. In some embodiments, the number or count of the D/A converters may be equal to the number or count of the divided digital signals. Each of the plurality of D/A converters may convert a divided digital signal into a channel of divided analog signal.

The storage component 1240 may store data/information. In some embodiments, the storage component 1240 may store the combined digital signal and the plurality of divided digital signals. The storage component 1240 may be or include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

Figure 13:
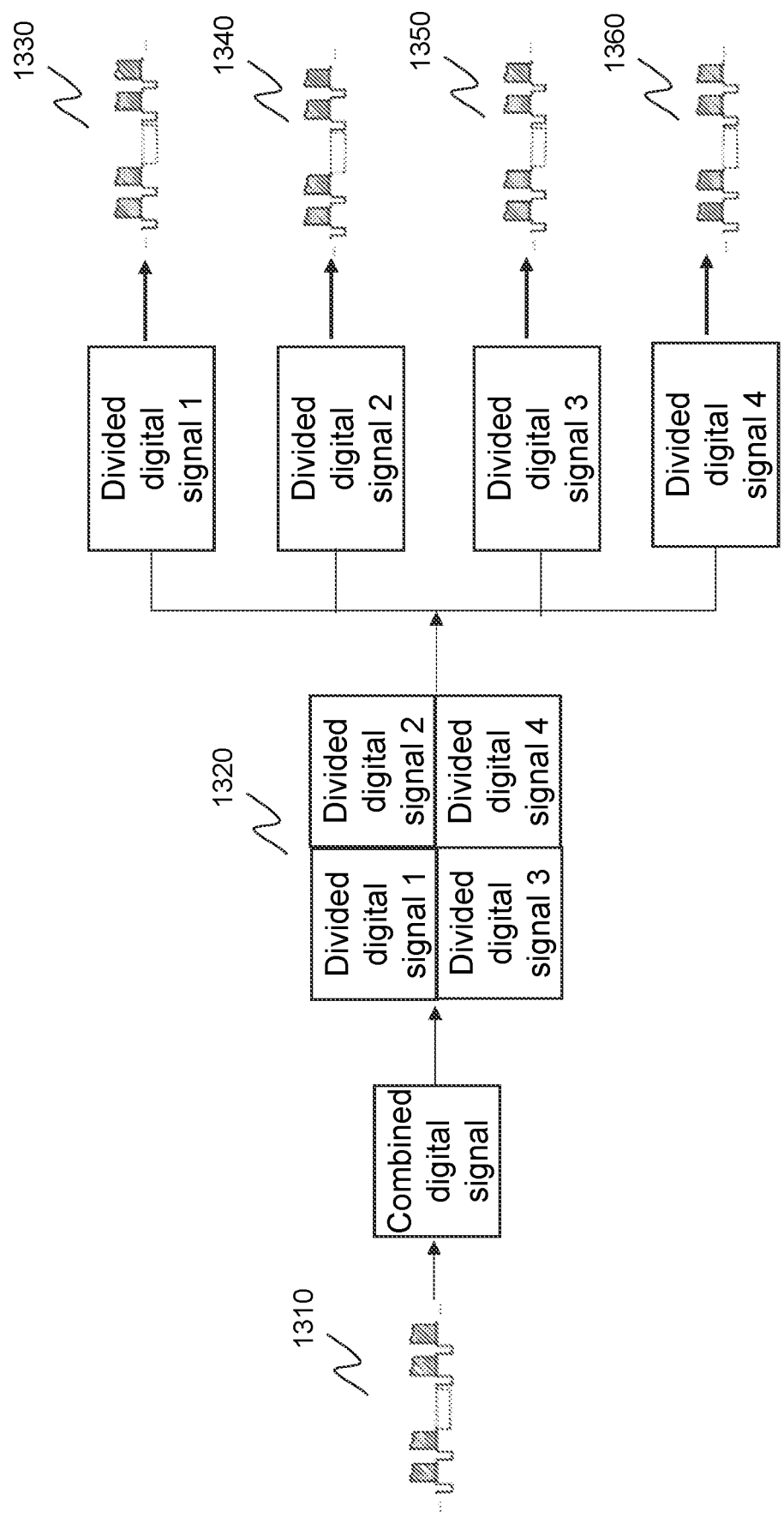
FIG. 13 is a schematic diagram illustrating an exemplary process for dividing combined analog signal into a plurality of channels of divided analog signals according to some embodiments of the present disclosure.

FIG. 13 is a schematic diagram illustrating an exemplary process for dividing combined analog signal into a plurality of channels of divided analog signals according to some embodiments of the present disclosure. As illustrated in FIG. 13, a channel of combined analog signal 1310 may be obtained. The channel of combined analog signal 1310 may be converted (e.g., using an A/D converter) into a combined digital signal. The combined digital signals may be filled into a preset area in a storage device 1320 so as to be divided into four divided digital signals. Then the four divided digital signals may be converted (e.g., using four D/A converters) into four channels of divided analog signals 1030-1060. The four channels of divided analog signals 1030-1060 may be transmitted to a video recorder or at least one terminal device over a relatively short distance. Each of the four channels of divided analog signals 1030-1060 may be transmitted via a cable (e.g., a coaxial cable).

In some embodiments, the combined digital signal may include four primary digital signals and three tags. Each of the three tags may be inserted between each two sequential primary digital signals. The combined digital signal may be divided into four portions according to the three tags. Each of the four portions of the combined digital signal may be designated as one of the four divided digital signals. In some other embodiments, the combined digital signal may include the four primary digital signals and information of discrete areas storing the four primary digital signals. Similarly, the combined digital signal may be divided into four portions according to the information of discrete areas. Each of the four portions of the combined digital signal may be designated as one of the four divided digital signals.

In view of the foregoing, the signal combing device and the signal dividing device may implement video signal transmission via a single cable (e.g., a coaxial cable) over a long distance, thus reducing the cost on the establishment and maintenance of the communicative connection between a plurality of signal sources and at least one terminal device while maintaining the quality and real-time performance of the video signals.

Figure 14:
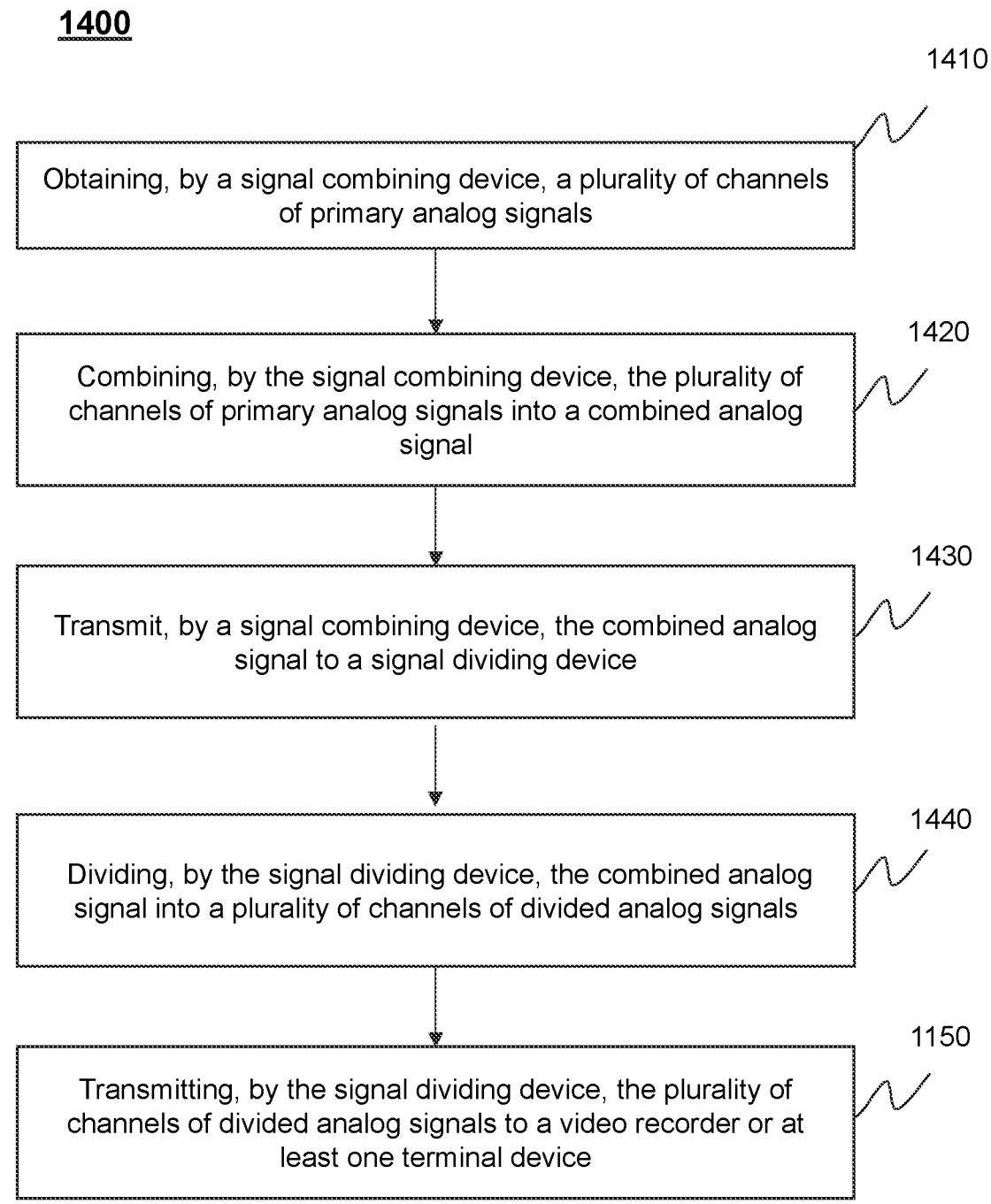
FIG. 14 is a flow chart illustrating an exemplary process for transmitting a plurality of channels of analog signals to at least one terminal device according to some embodiments of the present disclosure.

FIG. 14 is a flow chart illustrating an exemplary process for transmitting a plurality of channels of analog signals to at least one terminal device according to some embodiments of the present disclosure. In some embodiments, the process 1400 may be implemented on the video transmission system 100 as illustrated in FIG. 1. For example, the process 800 may be stored in a storage medium (e.g., the storage device 106 of the video processing device 104, the storage 227 of the computing device 220) as a form of instructions, and invoked and/or executed by the video processing device 104. The operations in the process 1400 presented below are intended to be illustrative. In some embodiments, the process 1400 may be accomplished with one or more additional operations not described, and/or without one or more of the operations discussed. Additionally, the order in which the operations of the process 1400 as illustrated in FIG. 14 and described below may not be intended to be limiting. In some embodiments, the process 1400 may be performed by the signal combining device 720 and the signal dividing device 730 of the video processing device 710.

In 1410, the signal combining device 720 may obtain a plurality of channels of primary analog signals.

In some embodiments, the plurality of channels of primary analog signals may be obtained from a plurality of signal sources. Each of the plurality of signal sources may be a camera (e.g., the camera 102) and/or a media server (e.g., the media server 103). In some embodiments, the plurality of signal sources may be a plurality of cameras (e.g., camera 1, camera 2, and camera N (N is a natural number greater than 2)). The cameras may be an analog camera, a digital camera, a video camera, a security camera, a web camera, a smartphone, a tablet, a laptop, a video gaming console equipped with a web camera, a camera with multiple lenses, etc. In some embodiments, the number or count of channels of the primary analog signals may be the same as the number or count of the signal sources. In some embodiments, the number or count of channels of the primary analog signals may be smaller than the number or count of the signal sources.

In 820, the signal combining device 720 may combine the plurality of channels of primary analog signals into a combined analog signal. The combined analog signal may be in the form of a channel of signal.

The signal combining device 720 may convert the plurality of channels of primary analog signals into a plurality of digital signals before the operation for combining the plurality of video signals is performed. Each of the plurality of digital signals may correspond to one of the plurality of channels of primary analog signals. The digital signals may also be referred to as primary digital signals. In some embodiments, the plurality of channels of primary analog signals may be converted into the plurality of primary digital signals using, for example, an analog-to-digital (A/D) converter, a decoder, etc.

After the plurality of primary digital signals are obtained, the signal combining device 720 may combine the primary digital signals in a predetermined manner. In some embodiments, the plurality of primary digital signals may be stored in at least one preset area of a storage device (e.g., the storage device 106, the storage 227, the ROM 223, a memory, a cloud storage, etc.). The plurality of primary digital signals may be filled into the at least one preset area in sequence so that a combined digital signal may be generated.

In some embodiments, the plurality of primary digital signals may be filled into an area of a storage device according to a certain order so as to form the combined digital signal. The certain order may be set by a user, according to default settings of the video transmission system 100, etc. In some embodiments, a tag may be generated and inserted between each two sequential primary digital signals of the plurality of primary digital signals. A tag may be used to separate two sequential primary digital signals from each other. The combined digital signal may include the plurality of primary digital signals and the multiple tags.

In some embodiments, each of the plurality of primary digital signals may be filled into a discrete area in the storage device. A combined digital signal may be generated by combining the plurality of primary digital signals in the discrete areas in the storage device. At least one blank area may be disposed between each two discrete area. In some embodiments, information (e.g., a location, a size, etc.) of each discrete area storing a primary digital signal may be obtained. The combined digital signal may include the plurality of primary digital signals and the information of the discrete areas storing the plurality of primary digital signals.

In some embodiments, other processing operations (e.g., compression, encryption, denoising, etc.) may further be performed on the plurality of primary digital signals and/or the combined digital signal. For example, the combined digital signal may be encoded using an algorithm for video compression so that the cost (e.g., time cost, resource cost, etc.) for transmitting the video signal may be significantly reduced.

According to transmission characteristics of video signals, the combined digital signal may be converted into a combined analog signal. The combined digital signal may be converted into the combined analog signal using, for example, a D/A converter, a modulator, etc.

In 1430, the signal combining device 720 may transmit the combined analog signal to a signal dividing device (e.g., the signal dividing device 730). The signal dividing device may divide the combined analog signal into a plurality of divided analog signals. The signal combining device 720 may connect to the signal dividing device 730 via a single cable (e.g., a coaxial cable). In some embodiments, the signal combining device 720 may connect to the signal dividing device 730 via two cables (e.g., including a main cable and an additional cable used together with the main cable or being standby), three cables, etc.

In 1440, the signal dividing device 730 may divide the combined analog signal into a plurality of channels of divided analog signals. Each of the plurality of channels of divided analog signals may correspond to one of a plurality of channels of primary analog signals obtained from a plurality of signal sources.

The signal dividing device 730 may convert the combined analog signal into a combined digital signal before the operation. In some embodiments, the combined digital signal herein may be the same as the combined digital signal obtained in 1420. In some embodiments, the combined analog signal may be converted into the combined digital signal using an analog-to-digital (A/D) converter, a decoder, etc.

After the combined digital signal is obtained, the signal dividing device 730 may divide the combined digital signal into a plurality of divided digital signals. In some embodiments, the combined digital signal may be stored in a preset area of a storage device (e.g., the storage device 106, the storage 227, the ROM 223, a cloud storage, etc.). The combined digital signal filled into the preset area may be divided in a predetermined manner so that the plurality of divided digital signals may be generated.

As mentioned above, in some embodiments, the combined digital signal generated in 1420 may include a plurality of primary digital signals and multiple tags. Each of the multiple tags may be inserted between each two sequential primary digital signals. The signal dividing device 730 may divide the combined digital signal into a plurality of portions according to the multiple tags. Each of the plurality of portions of the combined digital signal may be designated as one of the plurality of divided digital signals.

In some other embodiments, the combined digital signal generated in 1420 may include the plurality of primary digital signals and information of discrete areas storing the plurality of primary digital signals. Similarly, the signal dividing device 730 may divide the combined digital signal into a plurality of portions according to the information of discrete areas. Each of the plurality of portions of the combined digital signal may be designated as one of the plurality of divided digital signals.

In some embodiments, other processing operations (e.g., decompression, decryption, denoising, etc.) may further be performed on the combined digital signal and/or the plurality of divided digital signals. For example, the combined digital signal may be decoded using an algorithm for video decompression.

According to the transmission characteristics of video signals, each of the plurality of divided digital signals may be converted into a channel of divided analog signal. In some embodiments, the plurality of divided digital signals may be converted into a plurality of channels of divided analog signals using, for example, a D/A converter, a modulator, etc. Each of the plurality of channels of divided analog signals may correspond to one of a plurality of channels of primary analog signals obtained from a plurality of signal sources.

In 1450, the signal dividing device 730 may transmit the plurality of channels of divided analog signals to a video recorder or at least one terminal device.

The signal dividing device 730 may connect to the at least one terminal device via cables. In some embodiments, the plurality of channels of divided analog signals may be transmitted to the at least one terminal device via a plurality of cables. In some embodiments, the number or count of the cables may be equal to the channels of divided analog signals. Each of the plurality of channels of divided analog signals may be transmitted to the at least one terminal device via a cable.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system for transmitting a plurality of channels of primary analog signals to at least one terminal device, the system comprising:
   a signal combining device configured to:
   combine the plurality of channels of primary analog signals into a combined analog signal; and
   transmit the combined analog signal to a signal dividing device via a cable; and
   the signal dividing device configured to:
   divide the combined analog signal into a plurality of channels of divided analog signals, each of the plurality of channels of divided analog signals corresponding to one of the plurality of channels of primary analog signals; and
   transmit the plurality of channels of divided analog signals to the at least one terminal device;
   wherein the signal combining device includes:
   a decoding component configured to convert the plurality of channels of primary analog signals into a plurality of primary digital signals;
   a first processing component configured to combine the plurality of primary digital signals into a combined digital signal; and
   a modulating component configured to convert the combined digital signal into the combined analog signal;
   the signal dividing device includes:
   a decoding component configured to convert the combined analog signal received from the signal combining device into a combined digital signal;
   a second processing component configured to divide the combined digital signal into a plurality of divided digital signals; and
   at least one modulating component configured to convert the plurality of divided digital signals into the plurality of channels of divided analog signals;
   wherein to combine the plurality of primary digital signals into the combined digital signal, the first processing component is configured to:
   store the plurality of primary digital signals into a first storage component;

generate the combined digital signal by combining the plurality of primary digital signals stored in the storage component sequentially; and insert a tag between each two sequential primary digital signals of the plurality of primary digital signals; and wherein to divide the combined digital signal into the plurality of divided digital signals, the second processing component is configured to:

store the combined digital signal into a second storage component;

divide the combined digital signal stored in the second storage component into the plurality of divided digital signals based on tags inserted between each two sequential primary digital signals of the plurality of primary digital signals; and generate the plurality of divided digital signals based on the combined digital signal stored in the second storage component.

2. The system of claim 1, wherein the signal combining device is further configured to obtain the plurality of channels of primary analog signals from a plurality of signal sources.

3. The system of claim 2, wherein to obtain the plurality of channels of primary analog signals from the plurality of signal sources, the signal combining device is configured to:

obtain a first plurality of channels of analog signals from the plurality of signal sources;

identify a second plurality of channels of analog signals from the first plurality of channels of analog signals, wherein the second plurality of channels of analog signals satisfy at least one preset condition; and designate the second plurality of channels of analog signals as the plurality of channels of primary analog signals.

4. The system of claim 3, wherein the preset condition relates to at least one of a validity or stability of each of the first plurality of channels of analog signals.

5. A method for transmitting a plurality of channels of primary analog signals to at least one terminal device, the method comprising:

combining, by a signal combining device, the plurality of channels of primary analog signals into a combined analog signal;

transmitting, by the signal combining device, the combined analog signal to a signal dividing device via a cable;

dividing, by the signal dividing device, the combined analog signal into a plurality of channels of divided analog signals, each of the plurality of channels of divided analog signals corresponding to one of the plurality of channels of primary analog signals; and transmitting, by the signal dividing device, the plurality of channels of divided analog signals to the at least one terminal device;

wherein combining, by a signal combining device, the plurality of channels of primary analog signals into a combined analog signal comprises:

converting, by the signal combining device, the plurality of channels of primary analog signals into a plurality of primary digital signals;

combining, by the signal combining device, the plurality of primary digital signals into a combined digital signal; and converting, by the signal combining device, the combined digital signal into the combined analog signal;

wherein dividing, by the signal dividing device, the combined analog signal into a plurality of channels of divided analog signals comprises:

converting, by the signal dividing device, the combined analog signal received from the signal combining device into a combined digital signal;

dividing, by the signal dividing device, the combined digital signal into a plurality of divided digital signals;

converting, by the signal dividing device, the plurality of divided digital signals into the plurality of channels of divided analog signals;

wherein combining, by the signal combining device, the plurality of primary digital signals into the combined digital signal comprises:

storing the plurality of primary digital signals into a first storage component;

generate the combined digital signal by combining the plurality of primary digital signals stored in the storage component sequentially; and insert a tag between each two sequential primary digital signals of the plurality of primary digital signals; and wherein dividing the combined digital signal into the plurality of divided digital signals comprises:

storing the combined digital signal into a second storage component;

dividing the combined digital signal stored in the second storage component into the plurality of divided digital signals based on tags inserted between each two sequential primary digital signals of the plurality of primary digital signals; and generating the plurality of divided digital signals based on the combined digital signal stored in the second storage component.

6. The method of claim 5, further including:

obtaining, by the signal combining device, the plurality of channels of primary analog signals from a plurality of signal sources.

7. The method of claim 6, wherein obtaining the plurality of channels of primary analog signals from the plurality of signal sources includes:

obtaining a first plurality of channels of analog signals from the plurality of signal sources;

identifying a second plurality of channels of analog signals from the first plurality of channels of analog signals, wherein the second plurality of channels of analog signals satisfy at least one preset condition, wherein the preset condition relates to at least one of a validity or stability of each of the first plurality of channels of analog signals; and designating the second plurality of channels of analog signals as the plurality of channels of primary analog signals.

8. A non-transitory computer readable medium, comprising at least one set of instructions for transmitting a plurality of channels of primary analog signals to at least one terminal device, wherein when executed by a video processing device including a signal combining device and a signal dividing device, at least one set of instructions causes the video processing device to perform one or more operations, the one or more operations comprising:

combining, by the signal combining device, the plurality of channels of primary analog signals into a combined analog signal;

transmitting, by the signal combining device, the combined analog signal to the signal dividing device via a cable;

dividing, by the signal dividing device, the combined analog signal into a plurality of channels of divided analog signals, each of the plurality of channels of divided analog signals corresponding to one of the plurality of channels of primary analog signals; and transmitting, by the signal dividing device, the plurality of channels of divided analog signals to the at least one terminal device;

wherein combining, by the signal combining device, the plurality of channels of primary analog signals into a combined analog signal comprises:

converting, by the signal combining device, the plurality of channels of primary analog signals into a plurality of primary digital signals;

combining, by the signal combining device, the plurality of primary digital signals into a combined digital signal; and converting, by the signal combining device, the combined digital signal into the combined analog signal;

wherein dividing, by the signal dividing device, the combined analog signal into a plurality of channels of divided analog signals comprises:

converting, by the signal dividing device, the combined analog signal received from the signal combining device into a combined digital signal;

dividing, by the signal dividing device, the combined digital signal into a plurality of divided digital signals; and converting, by the signal dividing device, the plurality of divided digital signals into the plurality of channels of divided analog signals;

wherein combining, by the signal combining device, the plurality of primary digital signals into the combined digital signal comprises:

storing the plurality of primary digital signals into a first storage component;

generate the combined digital signal by combining the plurality of primary digital signals stored in the storage component sequentially; and insert a tag between each two sequential primary digital signals of the plurality of primary digital signals; and wherein dividing the combined digital signal into the plurality of divided digital signals comprises:

storing the combined digital signal into a second storage component;

dividing the combined digital signal stored in the second storage component into the plurality of divided digital signals based on tags inserted between each two sequential primary digital signals of the plurality of primary digital signals; and generating the plurality of divided digital signals based on the combined digital signal stored in the second storage component.

* * * * *